(12) United States Patent
Roter et al.

(10) Patent No.: US 9,249,807 B2
(45) Date of Patent: Feb. 2, 2016

(54) FLUIDIC FLOW CAPTURE AND ACCELERATION APPARATUS FOR HYPER-CONVERSION

(75) Inventors: Samuel Roter, Bloomington, MN (US); Laurence A. Pepper, Minnetonka, MN (US)

(73) Assignee: Yup Power Inc., Minnetonka, MN (US)

( * ) Notice: Subject to any disclaimer, the term of this patent is extended or adjusted under 35 U.S.C. 154(b) by 0 days.

(21) Appl. No.: 13/978,363

(22) PCT Filed: Jan. 3, 2012

(86) PCT No.: PCT/US2012/020100
§ 371 (c)(1),
(2), (4) Date: Sep. 4, 2013

(87) PCT Pub. No.: WO2012/094336
PCT Pub. Date: Jul. 12, 2012

(65) Prior Publication Data
US 2013/0334825 A1    Dec. 19, 2013

Related U.S. Application Data

(60) Provisional application No. 61/429,307, filed on Jan. 3, 2011.

(51) Int. Cl.
*F03B 17/06*    (2006.01)
*F04D 29/52*    (2006.01)
(Continued)

(52) U.S. Cl.
CPC ............ *F04D 29/522* (2013.01); *F03B 17/061* (2013.01); *F03D 1/04* (2013.01);
(Continued)

(58) Field of Classification Search
CPC .................................. F03B 17/06; F03D 7/06
USPC ............................................... 415/2.1; 290/55
See application file for complete search history.

(56) References Cited

U.S. PATENT DOCUMENTS 264,164 A * 9/1882 Jackson .................... 415/2.1
3,720,840 A * 3/1973 Gregg .......................... 290/55
(Continued)

FOREIGN PATENT DOCUMENTS

KR    10-2005-0107551 A    11/2005

OTHER PUBLICATIONS

International Search Report for corresponding International Application No. PCT/US2012/020100, mailed on Jun. 28, 2012.
(Continued)

*Primary Examiner* — Joseph Waks
(74) *Attorney, Agent, or Firm* — Kinney & Lange, P.A.

(57) ABSTRACT

An apparatus for converting fluidic flow into electrical energy includes a focusing chamber through with fluidic flow enters, a fin diverter positioned adjacent an entrance of the focusing chamber, a constricting chamber positioned adjacent a downstream end of the focusing chamber having a flow passage that converges in a frustum shape, a streamliner positioned adjacent an outlet end of the constricting chamber, an extraction chamber positioned adjacent the streamliner, an energy converter driven by the fluidic flow passing through the extraction chamber for producing electrical energy, and a diffusing chamber positioned to receive at an inlet end the fluidic flow passing out of the extraction chamber, the diffusing chamber having a flow passage that diverges from the inlet end of the diffusing chamber to an exhaust end at which the fluidic flow exits the apparatus.

19 Claims, 16 Drawing Sheets

(51) Int. Cl.
    *F03D 1/04*         (2006.01)
    *F03D 3/04*         (2006.01)
    *F03D 9/00*         (2006.01)

(52) U.S. Cl.
    CPC ............... *F03D 3/04* (2013.01); *F03D 3/0427* (2013.01); *F03D 9/002* (2013.01); *F05B 2240/133* (2013.01); *F05B 2240/211* (2013.01); *F05B 2240/9112* (2013.01); *Y02B 10/30* (2013.01); *Y02B 10/50* (2013.01); *Y02E 10/28* (2013.01); *Y02E 10/728* (2013.01); *Y02E 10/74* (2013.01)

(56) References Cited

U.S. PATENT DOCUMENTS

| | | | | |
|---|---|---|---|---|
| 3,924,966 | A * | 12/1975 | Taminini | 416/177 |
| 4,019,537 | A * | 4/1977 | Bonnard et al. | 138/37 |
| 4,076,448 | A * | 2/1978 | Sanders, Jr. | 415/198.1 |
| 4,086,026 | A * | 4/1978 | Tamanini | 416/176 |
| 4,191,505 | A * | 3/1980 | Kaufman | 415/2.1 |
| 4,516,907 | A | 5/1985 | Edwards | |
| 6,538,340 | B2 * | 3/2003 | Elder | 290/55 |
| 6,638,005 | B2 * | 10/2003 | Holter et al. | 415/4.2 |
| 6,765,309 | B2 * | 7/2004 | Tallal et al. | 290/55 |
| 6,981,839 | B2 * | 1/2006 | Fan | 415/4.1 |
| 7,753,644 | B2 * | 7/2010 | Krippene | 415/4.2 |
| 7,874,788 | B2 * | 1/2011 | Stothers et al. | 415/4.5 |
| 7,880,322 | B2 * | 2/2011 | Cumings et al. | 290/54 |
| 8,403,623 | B2 * | 3/2013 | Krippene | 415/4.2 |
| 8,459,930 | B2 * | 6/2013 | Krippene | 415/4.2 |
| 8,801,359 | B2 * | 8/2014 | Sherrer | 415/1 |
| 2003/0133782 | A1 * | 7/2003 | Holter et al. | 415/4.2 |
| 2005/0002783 | A1 | 1/2005 | Hiel | |
| 2007/0231118 | A1 | 10/2007 | Krippene | |
| 2007/0284884 | A1 * | 12/2007 | Stothers et al. | 290/54 |
| 2009/0280008 | A1 * | 11/2009 | Brock | 415/208.2 |
| 2010/0278629 | A1 * | 11/2010 | Krippene | 415/1 |
| 2011/0241334 | A1 * | 10/2011 | Kawano | 285/179 |
| 2012/0328425 | A1 * | 12/2012 | Morales Franqui | 415/187 |
| 2013/0119661 | A1 * | 5/2013 | Pringle et al. | 290/44 |

OTHER PUBLICATIONS

Written Opinion for corresponding International Application No. PCT/US2012/020100, mailed on Jun. 28, 2012.

* cited by examiner

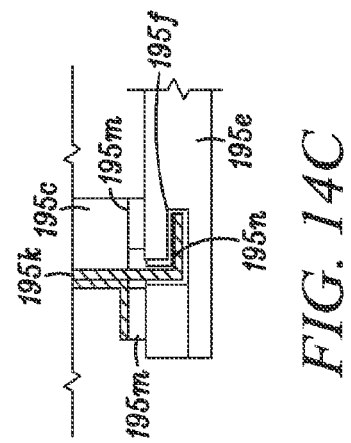
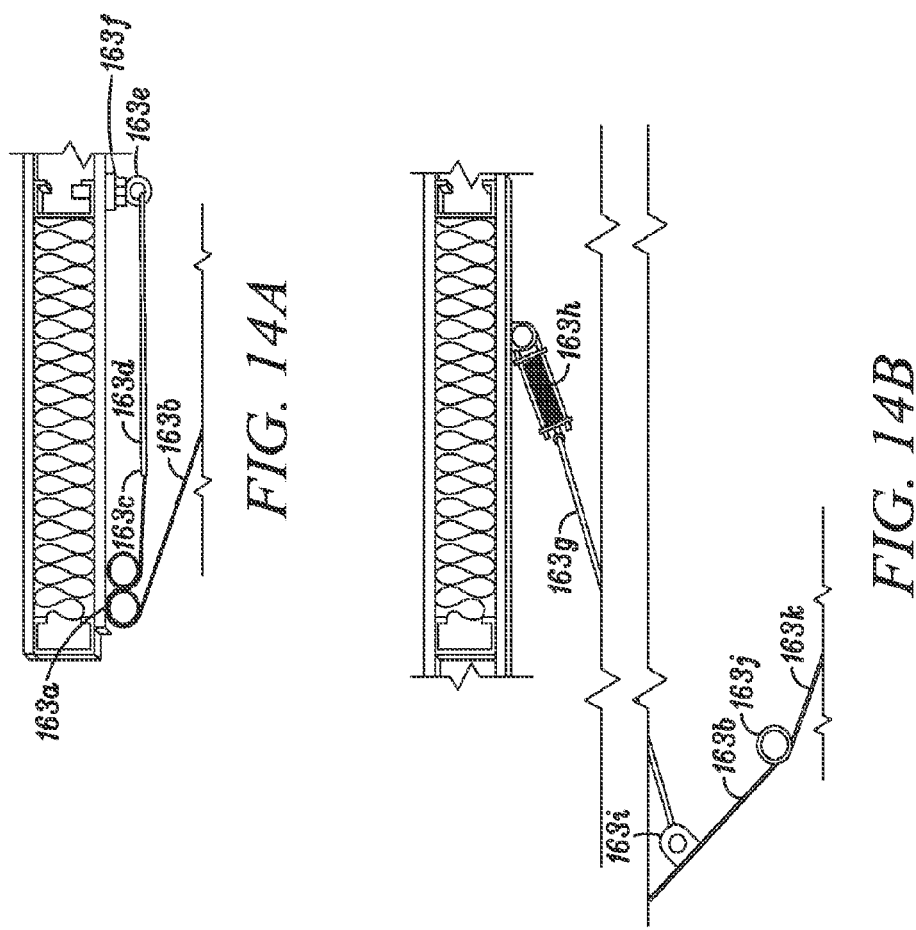

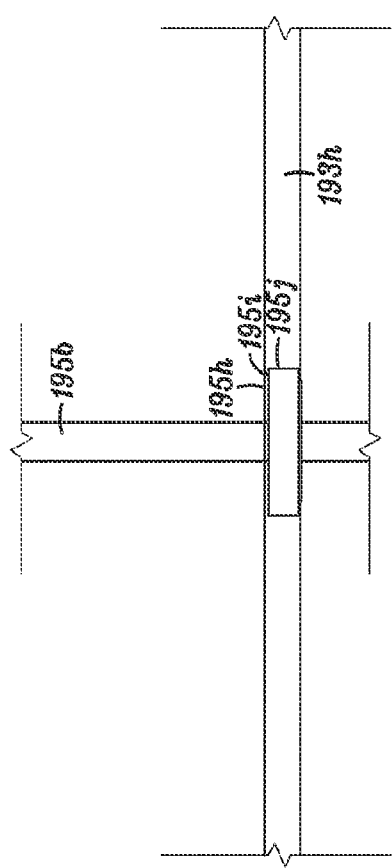
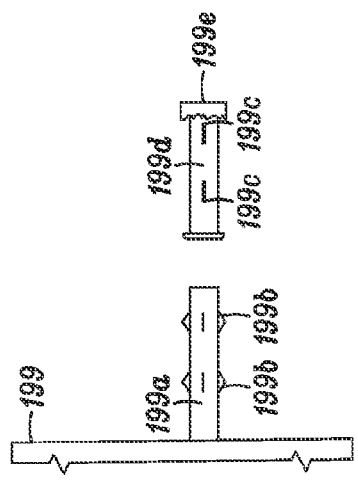
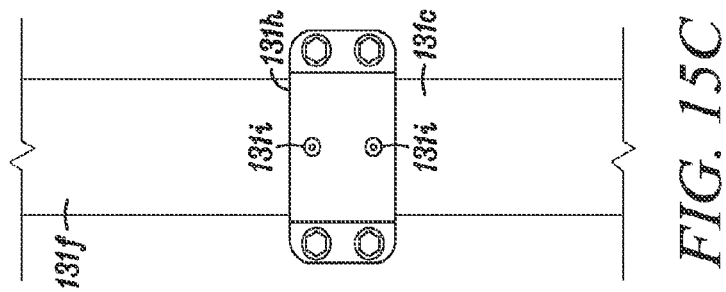

FLUIDIC FLOW CAPTURE AND ACCELERATION APPARATUS FOR HYPER-CONVERSION

CROSS REFERENCE TO RELATED APPLICATION

This application is a National Stage Application of PCT/US2012/020100, filed on 3 Jan. 2012, which claims the benefit of U.S. Provisional Application No. 61/429,307 filed 3 Jan. 2011, and which applications are incorporated herein by reference. A claim of priority to all, to the extent appropriate, is made.

TECHNICAL FIELD OF INVENTION

This invention relates to a method and apparatus for fluidic flow capture and acceleration. More specifically, this application relates to a method and apparatus for increasing the efficiency of fluidic flow conversion into electrical energy, while diminishing many reprehensible aspects.

BACKGROUND

There are many apparatus and methods for converting fluidic flows, such as wind and water, into electrical energy. One area many seem to be concerned about is urban wind exploitation. The current art lacks an effective method which is compatible with urban requirements. There is a great urgency in urban areas for many reasons. Some of the reasons include having the electrical infrastructure in place to move generated electricity to a wider area grid. Another reason includes meeting increasing demands for energy in the area where the demand is from. Urban requirements call for a system which is quietly inconspicuous, reliable, and highly productive. Of course, in addition to urban energy exploitation there may also be a need to exploit the wind or other fluids in non-urban areas.

While the potential benefits of urban power generation and especially onsite and domestic urban wind conversion present obvious advantages; the problems of noise, visual esthetics, siting uncertainty, and poor results at contextual urban elevations has severely limited or substantially all but banished wind conversion methods and apparatus from urban areas.

SUMMARY

This apparatus and method is a fluidic flow power converting and masking device which utilizes some of the enhancing principles of wind tunnel technology to maintain laminarity while capturing and accelerating fluidic flow. The inventive method and apparatus provides a neighbor-friendly, productive method for wind conversion. The invention presents a major change in wind conversion strategy as a fundamental, systemic shift in wind exploitation strategy. This is the focus of the apparatus and methods disclosed herein. It should be noted that the apparatus, in this application, is sometimes referred to as the Windjuicer apparatus.

The Windjuicer apparatus is directed to a class 2 machine that captures, refines and accelerates fluidic flows, especially naturally occurring flows and then focuses this hyper flow through any type of flow-to-energy converter, including commercial off-the-shelf ("COTS") flow-to-energy converters. The apparatus includes a series of chambers and appurtenances that, while contributing discrete effects, act synergistically in conjunction to produce an intensified result. The results include a vast increase in the quantity of electrical production over that possible from the prior art, and a substantial elimination of noise leakage and neighborhood esthetic objections that are precipitated by many, if not all, current installations of prior art solutions. The intrinsic nature of the apparatus allows intense insulation and vibration isolation as well as visual obfuscation without impairment of production potency. This will become apparent from the following figures and their explanation in the following paragraphs.

According to one or more example embodiments in a primary installation situation, common architectural features integrate with the apparatus in the sound and visual obfuscation process. In one example embodiment of the invention, a gambrel or another similar roof structure hides the entire system within the confines of a gambrel or other standard roof structure to render the system virtually invisible and silent. Enabling shapes of the segments have been investigated and enabling dimensional interrelated proportions have been determined. Certain shapes and dimensions discussed and shown in the example embodiments set forth in the specification portion of this application are thought to be substantially optimized. Whereas these shapes and their proportional relationships are substantially optimal as to the current state of knowledge as known to the applicant, it should be noted that the example embodiments set forth below are examples. Accordingly, the applicant intends to encompass any presently existing or developed morphological dimensional relationships which improve performance.

These and other features, aspects, and advantages of the present invention will become better understood with reference to the following drawings, descriptions and claims.

BRIEF DESCRIPTION OF DRAWINGS

In this preamble to the description of the drawings of the invention, it should be pointed out that some specific generally accepted graphic conventions as well as mathematical canons have been adopted for clarity. These conventions will be pointed out at first usage. In this respect, most drawings have used the convention of an 'x' axis as a reference datum.

Before any example embodiments are explained in detail, it is to be understood that the invention is not limited in its application to the details of construction and the arrangement of components set forth in the following description or the following drawings. The invention is capable of other embodiments and of being practiced or of being carried out in various ways using various materials. Also, it is to be understood that the phraseology and terminology used herein is for the purpose of description should not be regarded as limiting. The use of "including" and "comprising" and variations thereof herein is meant to encompass the items listed thereafter and equivalents thereof as well as additional items.

FIG. 10 also shows one or more example embodiments of the invention attached to a street light and a billboard.

FIGS. 14A-14C show two dimensional details of attachment of the apparatus, according to several example embodiments. FIG. 14A shows attachments of one version of the invention in which one or more chamber panels are fashioned from a membrane. This is a close-up of the focusing chamber as shown on FIG. 7. FIG. 14B shows an attachment detail for the posterior edge of the membrane panel of the focusing chamber and how that membrane will transition into a membrane embodiment of the compressing chamber. FIG. 14C shows an example embodiment of the tower appendage from FIGS. 11 and 12 showing a cutaway detail of the track connection to the revolving wind catcher.

FIGS. 15A-15B show two-dimensional details of one version of the appendage tower shown in FIGS. 11 and 12. FIG. 15A shows a cutaway detail of the weather vane connected rod passing through the tower roof. FIG. 15B shows the means for connecting a vane trunnion to the tower wall. FIG. 3 shows one version of the retainer connection between at least one of a vertical axis turbine ("VAT"), horizontal axis turbine ("HAT"), non-rotational conversion device ("NRC"), or water horizontal axis turbine ("WHAT").

FIG. 16 shows three dimensional details of important elements of the streamlining assembly which are not explicitly shown in other drawings.

DETAILED DESCRIPTION

Figure 1:
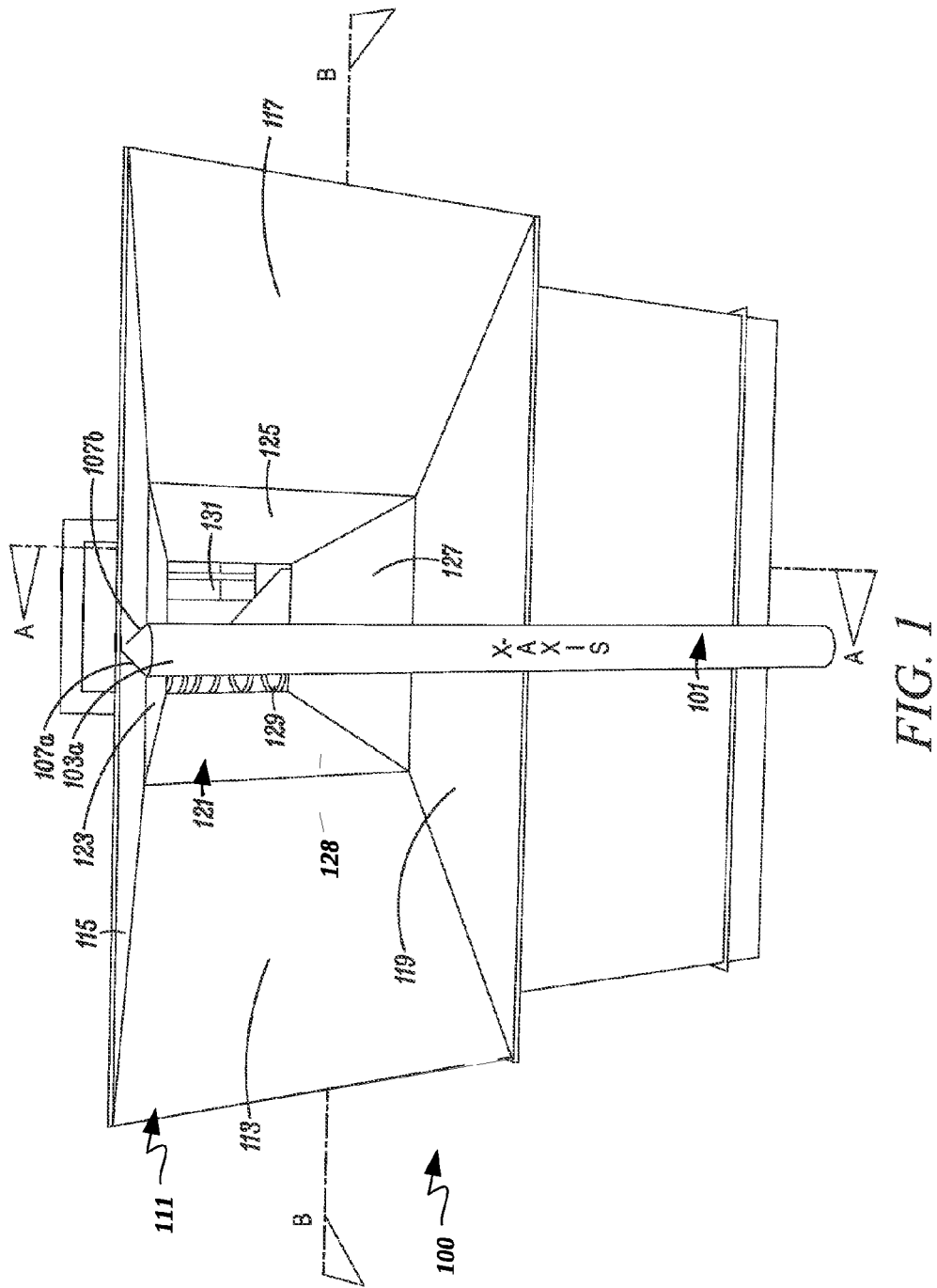
FIG. 1 is a semi perspective drawing of one version of the device looking into the anterior orifice of the focusing chamber, according to an example embodiment. The roof associated with this example embodiment has been removed for graphic clarity. The location of the section cutlines are presented here for reference.

It is envisioned that this invention will be used primarily within an urban context. It should be understood that the concepts and embodiments described herein can also be adapted to non-urban environments. The initial application will be by installation via the conversion of urban homes. The refined version will be marketed as a discrete architectural design element of new homes and commercial buildings. The example embodiment detailed below involves an installation within a hypothetical house referred to as the mounting platform or platform. Through a process of proportional scaling, further applications will involve placement of modular embodiments on the top and sides of building towers. Further application will be integrated into walkway covers along the sides of commercial buildings. Other deployments will be within bridges, overpasses, billboards and streetlights. With augmentation and modification other incarnations will be used under water to convert currents and tidal forces into electrical power. The assemblage comprises a number of interacting elements which are unique and have therefore been given new characteristic terms for easy reference. The lexicon of original terms is given below:

A fluidic flow redirecting and capturing means termed a 'Fin Diverter' or diverter;

a fluidic flow focusing means termed a 'Focusing Chamber';

a fluidic flow constricting means termed a 'Compressing Chamber';

a fluidic flow laminating and filtration means termed the 'Streamlining' assembly or streamliner;

a fluidic flow turbine enclosure means termed the 'Extraction Chamber';

a fluidic flow to energy converting means comprising either a non-rotational conversion device ("NRC") or one of many available commercial off-the-shelf ("COTS") turbine devices, which will be referred to as either a vertical axis turbine ("VAT"), horizontal axis turbine ("HAT"), or water axis turbine ("WHAT");

a fluid flow sucking means termed a 'Diffusing Chamber';
a fluidic flow dispersal means termed a 'Diffusing Flange';
a 'terrain effect' actuating means termed a 'Bump';
an oblique flow intercepting device termed 'Backstop Diverter' or backstop;
a circumference array of flow capture and carrying tubes along with a back-end spray nozzle termed 'Lubrication Layer Injectors' or simply injectors;
a fluidic flow overhead capture means termed 'Periscope Tower' or simply periscope.
a fluidic flow rotating capture means placed either at the upper stage of the Periscope Tower or at the main axis of chamber assemblies is termed the 'Rotating Scoop' or scoop;
The entire apparatus comprising any combination of the elements here disclosed is termed the 'Windjuicer'

The dimensions provided in the following example embodiments should be considered more for the relative dimensional relationships rather than the empirical size of the elements individually. Note that the following example embodiments are examples, and that other embodiments having different dimensions are contemplated as part of the invention.

FIG. 1 is a semi-perspective drawing of one version of apparatus 100 looking into an anterior orifice of a focusing chamber, according to an example embodiment, The roof associated with this example embodiment has been removed for graphic clarity. Apparatus 100 for fluidic flow capture and acceleration includes diverter 101, focusing chamber 111, and compression chamber 121.

FIG. 1 discloses diverter 101 along with the inside of the first two chambers (facing towards the flow to be captured) of the assemblage, namely focusing chamber 111 and compressing chamber 121. In this version, diverter 101 is shown sticking out of focusing chamber 111 about 400 centimeters and continuing back into focusing chamber 111 toward VAT 131 for about 100 centimeters. Diverter 101 is oriented along the 'x' axis of apparatus 100. Even flows approaching at an obtuse angle to the 'x' axis of apparatus 100 will be captured and diverted back into the maw of the focusing chamber 111, albeit at a proportionally decreased volume.

It is the concave surfaces of diverter 101 that create such latitude. Employing the principle of the 'Coanda' effect enables its concave surfaces to effectively divert fluidic flows back into focusing chamber 111. This diversion allows conversion of those otherwise lost, errant directional flows into energy production, Conversely, flows impinging upon apparatus 100 from an approximately parallel direction to that of the 'x' axis will be virtually undeterred from their passage around bullnose anterior edge 103a and into focusing chamber 111. Bullnose anterior edge 103a consists of an arc that, in this particular preferred embodiment, is at least a one half circle of about 304 millimeters in radius. Left flanking surface 107a is a concave in shape with a radius of about 1800 centimeters. The posterior edge, or back bullnose, 103b us an inexact mirror of bullnose anterior edge 103a, differing primarily in its size, which in this preferred embodiment is a one half circle with a radius of about 16 millimeters. The precaution of providing one or more weatherized sets of vents anywhere along the lower and upper exterior surface should be taken along with the provision of an adequately-configured insect screening fitted over the opening to prevent infestation.

The focusing chamber 111 in this embodiment forms a truncated pyramidal shape on its side centered on the 'x' axis. Focusing chamber 111 consists of four or more frustum-shaped enclosing planes or panels 113, 115, 117, and 119 distributed around the 'x' axis and fastened together seamlessly. The anterior orifice forms an open rectangular shape. Panels 113, 115, 117, and 119 continue along the 'x' axis, then finish at the juncture of compressing chamber 121, forming a seamless bond with an anterior orifice of compressing chamber 121, which is in the shape of a square as depicted FIG. 1.

In this preferred embodiment the left panel's (113) front edge starts out at about 780 centimeters along the anterior edge and ends up about 560 centimeters at its posterior edge while going along the 'x' axis for about 350 centimeters. Panel 117 may mirror this shape. The bottom panel measures about 1590 centimeters along its anterior edge and about 560 centimeters at its posterior edge and goes along the 'x' axis for about 350 centimeters. The top panel 115 may or may not mirror this shape. All panels are centered around the 'x' axis in this one of many viable embodiment configurations.

In the case of this favored embodiment the invention is configured upon a house or platform. The dimensional limits in this case would be the living space for the bottom plane; the side yard setbacks for the two flanking planes 113 and 117 The top plane 115 height is delimited by the municipality's zoning regulations and the roof configuration required to cover the assemblage.

The anterior orifice of compressing chamber 121 is formed by panels 123, 125, 127, and 128. All panels 123, 125, 127, and 128 are joined to a posterior orifice of focusing chamber 111 and to each other, forming a truncated pyramid (trapezoid) on its side. This volume reduction chamber functions as the name implies to compress the captured fluidic flow. By virtue of its length and shape, compressing chamber 121 has the capacity to calm and streamline the incoming fluidic flows while it concentrates them. Note that the honeycomb and screens forming streamliner 129 are cut away in this view for reasons of graphic clarity only. The taper of the sides is determined by mathematical function relative to given factors of length of platform size of COTS wind turbine and sufficient angle moderation as required to prevent flow-wall separation as derived from the Reynolds number calculation. In this preferred embodiment 4 equally sized panels arrayed equally around the 'x' axis seamlessly join the extraction chamber's anterior orifice and each other. In this preferred embodiment the anterior edges are all about 560 centimeters while the posterior edges are all about 280 centimeters in length. The chamber extends along the 'x' axis for about 350 centimeters from anterior orifice to posterior orifice. A VAT 131 is disclosed in a serial axially centric relationship to the compressing chamber.

Figure 2:
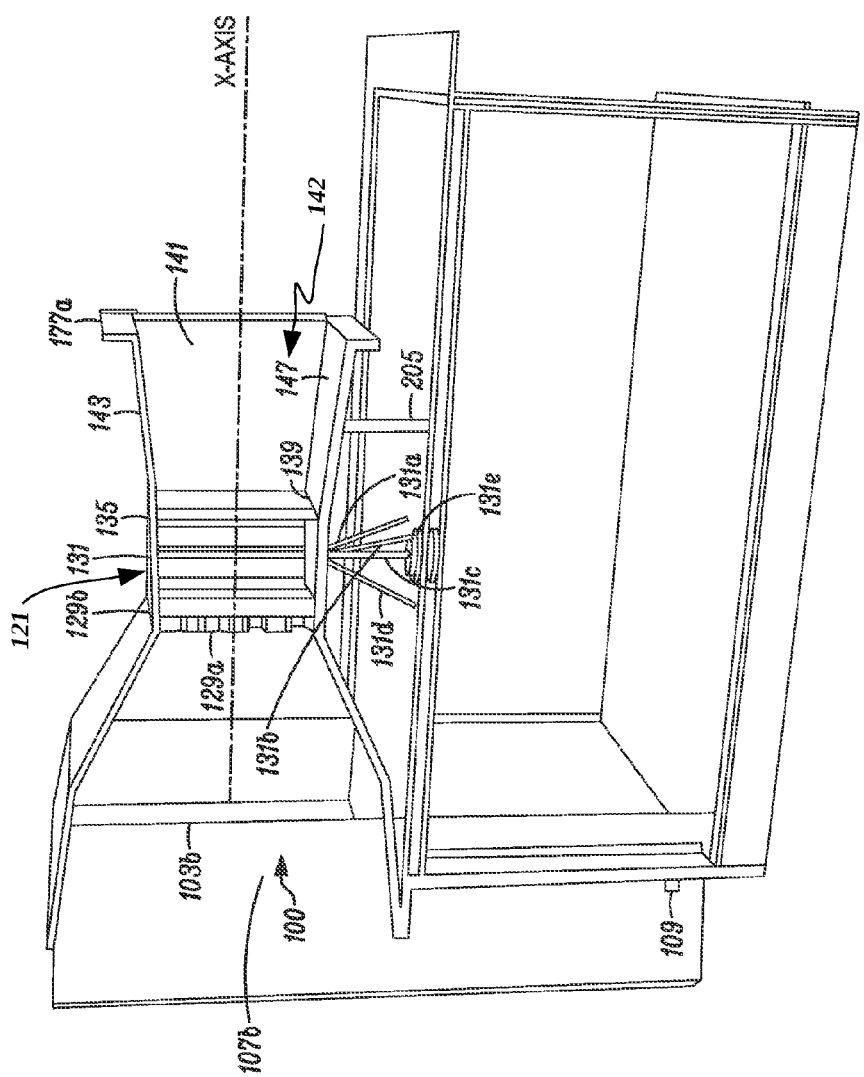
FIG. 2 is a perspective section drawing along cutline A-A of FIG. 1 through the longitudinal expanse of the example embodiment. Once again the roof has been removed.

FIG. 2 is a perspective section drawing along cutline A-A of FIG. 1 through the longitudinal expanse of the example embodiment. Once again the roof has been removed for the sake of clarity. FIG. 2 shows a section of one preferred embodiment of apparatus 100. Fin diverter 101 is shown from the side looking at concave right flanking surface 107b.

Clearly shown in FIG. 2 is the posterior orifice of compressing chamber 121 seamlessly joined to the anterior orifice of extraction chamber 135, which is about 280 centimeters along each edge. At about the junction between compressing chamber 121 and extraction chamber 135 is situated streamliner 129. Streamliner 129 includes honeycomb 129a followed by a series of fixed screens 129b (three in the example embodiment shown) in close proximity to each other. Honeycomb 129a is placed perpendicular to the 'x' axis. In this preferred embodiment honeycomb 129a is placed at the joint between compressing chamber 121 and extraction chamber 135 and about 10 centimeters forward of screens 129b. The cells of honeycomb 129a are configured from metal sheeting (18-25 gauge) firmly attached to all four panels of extraction chamber 135. The cells can also be made from polymers, metals or organic fiber. The cell shape is hexagonal in one embodiment. In another embodiment, the cells are cubic or triangular shaped. Cell length should be about 6-8 times the cell diameter.

The screen arrangement includes one or more screening sheets of metallic, polymer or fiber mesh held in place by one or more single frames holding the screens apart with separation of about 100 mm or by multiple frames fixed together. In the embodiment shown, three screens are held apart in a single frame are to have a solidity of about 44% but not to exceed a density of about 50%. The diameter or gauge of the wires is to be about 1 millimeter with a mesh size of about 3 millimeters. The screen and frame are configured for easy insertion perpendicularly into at least one slot cut into the extraction chamber 135 as shown on FIG. 16B. In this example embodiment, the extraction chamber 135 is to contain one or more slotted flange or groove on three of the sides which are so designed as to effectively contain at least one portion of the edge of the rigid screen frame and allow it to freely slide in and out through the slot in one or both of the chamber's sides. Mechanically attached to the access cover is to be at least one rigid handle as shown in FIG. 16A. The rigid handle facilitates the removal of the screen frame for cleaning. The cover attaches to either of the flanking edges of the extraction chamber 135's slot by any one of; snaps screws, clamps, nuts, connector or any similar means which will facilitate the easy removal while securing an airtight seal. The cover is to be rimmed with a suitable gasket as a means of forming an airtight flexible seal when cover is closed.

FIG. 2 shows one version of a COTS VAT installed into the extraction chamber 135. Any variation of VAT, HAT, NRC or WHAT can be accommodated by the invention by simply varying the dimensions of the chambers to suit.

FIG. 2 shows support and bracing of any of the above converting methods. In the example of one preferred embodiment, a VAT support systems is shown comprising one or more of the following: a vertical stand pipe 131c leading down to a secured solid or hollow base 131e; a tripod base 131d; a horizontal brace 131a; stabilizer sets connecting the brace to one or more platform structural elements and or chamber; or any combination thereof 131b. Support and bracing elements comprising sufficiently rigid shaped solid or hollow elements are affixed to a sufficient VAT, NRC, HAT, or WHAT device at one end and the platform at the other. In addition the stand pipe 131c and the base 131e may also serve as a conduit for wiring and or container for control and or monitoring connectors. Any yaw, pitch or roll facility must be removed or controlled by means of connection with one or more of the bracing elements as shown in FIG. 15A. One or more additional support posts 205 are of a sufficient size and shape and material to support the turbine, compression chamber, focusing chamber, and extraction chamber. The support structure can be affixed to any portion of the apparatus as needed.

The VAT is contained by the extraction chamber 135 which in this example embodiment is a rectangular chamber of about 280 centimeters in height; about 280 centimeters in width and about 200 centimeters in length. The panels are connected by a seamless joint along each edge to each other, the posterior orifice of the compressing chamber and the anterior orifice of the diffusing chamber. Any one of the side or top panels or any combination thereof are removable through the use of fasteners; screws, bolts, toggles, snaps or any combination thereof to afford access to the fluid to energy converter for service and replacement. The seal around the edges of any removable panels are to be rendered sound proof through tightness and or a gasket sufficient to that purpose. The gasket material can be made of material having sound insulating qualities.

Diffusing chamber 142 is attached subsequent to extraction chamber 135. Diffusing chamber 142 comprises four planes or panels 141, 143, 145, (not visible in cutaway view of FIG. 2, shown in FIG. 3), and 147, which are fused to each other by a seamless joint. All edges of the anterior orifice of diffusing chamber 142 are fused to the posterior orifice of extraction chamber 135. The sides of diffusing chamber are 142 substantially equidistantly arrayed about the central 'x' axis and extend along the axis for about 300 centimeters. The posterior edges form at least one orifice of about 340 centimeters on each side.

An appurtenance may or may not be arrayed around the posterior edges of diffusing chamber 142. In the example embodiment shown in FIGS. 1 and 2, diffuser flange 177a of about 50 centimeters extending away from the diffusing chamber posterior rim at right angles to the 'x' axis. Diffuser flange 177a is made of the same material as diffusing chamber 142 and will be mechanically fused to the rim by a means of connection sufficiently resilient to prevent detachment under the most extreme flow conditions to be expected. This element will not be used for installation in which the assembly is enclosed within a house roof.

Figure 3:
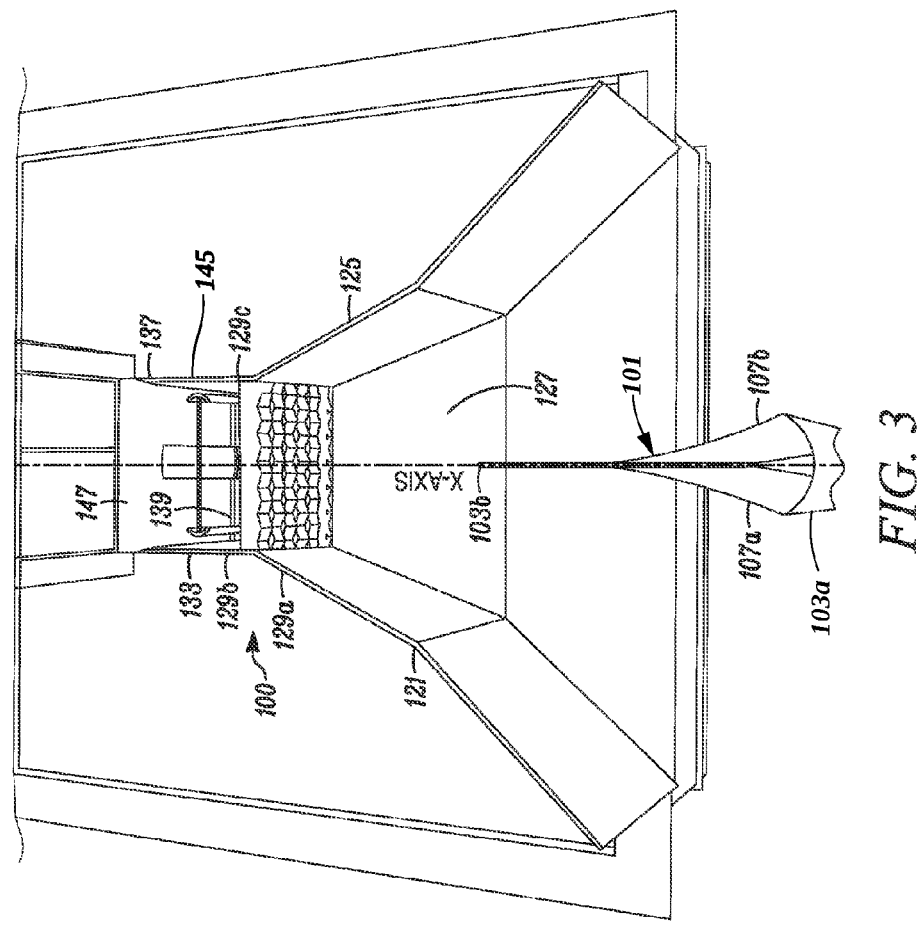
FIG. 3 is a perspective section along cut B-B of FIG. 1 which is taken across the upper part of one version of the device producing a plan-like view of all chambers, according to an example embodiment. Once again the roof has been removed.

FIG. 3 is a perspective section along cutline B-B of FIG. 1, which is taken across the upper part of embodiment of the device producing a plan-like view of all chambers, according to an example embodiment. Once again the roof has been removed. FIG. 3 shows the entire assemblage in semi-perspective plan along section cut A-A. In this view, honeycomb 129a and screen assemblage 129b are shown. Screen assemblage 129a is held taut by a frame which is sufficiently rigid and smooth to facilitate easy removal by means of access panel 129c with handle 129g (shown and described in FIG. 16A) attached. In this respect extraction chamber 135 is to have an interior circumferential groove 129k (shown on sheet 16) of sufficient size to allow firm retention yet easy slidability of the framed screens for service.

The cut-away panels of all chambers are shown revealing the enlarged cavity for the placement of sound insulation material sufficient to produce a Sound Transmission Class ("STC") rating of about 30 to 60. In the example embodiment illustrated in FIG. 3, all chamber panels include at least one or more rigid, extruded polystyrene insulation encased within a 2×4 wood frame cavity wall surfaced with a typical smooth drywall finish. The interior chamber membrane may alternatively include any material suitable to the use.

Figure 4:
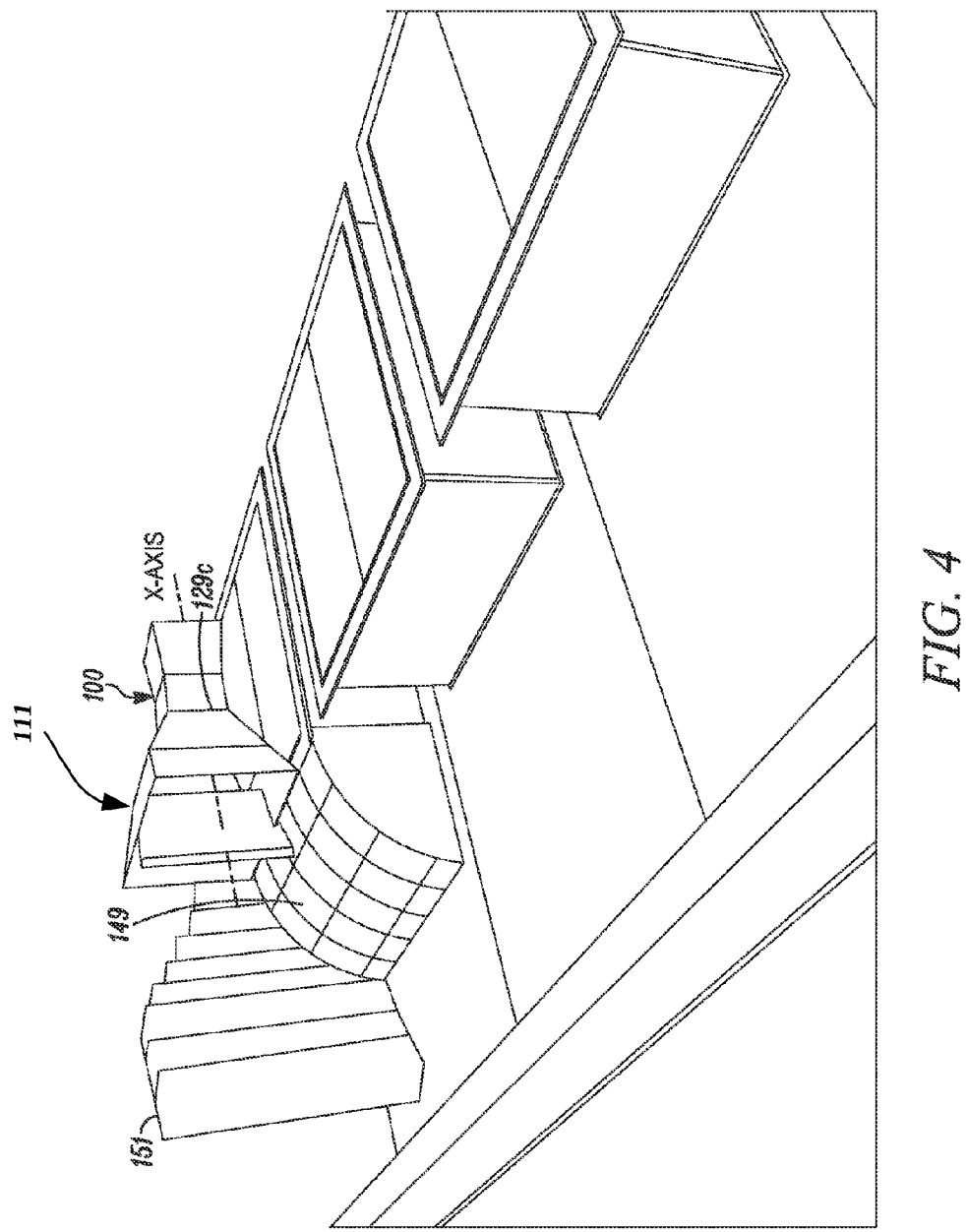
FIG. 4 is a perspective view of an example embodiment of the device placed on a hypothetical house, which is termed its platform of installation or simply platform, in an urban neighborhood. This drawing shows the positioning of a topiary backstop for the enhanced capture of tangential approaching breezes. Also shown is one possible example embodiment of a 'bump' element in the form of a commercial off-the-shelf ("COTS") sunroom. Once again the roof has been removed.

FIG. 4 is a perspective view of an example embodiment of apparatus 100 placed on a house or residential dwelling, which is termed its platform of installation or simply platform, in an urban neighborhood. This drawing shows the positioning of a backstop diverter 151 for the enhanced capture of tangential approaching breezes. Also shown is one possible example embodiment of a 'bump' element in the form of a COTS sunroom 149. Once again the roof has been removed for the sake of clarity. FIG. 4 shows apparatus 100 (shown and described in FIGS. 1 to 3 above) utilizing an urban sited house as the platform. This drawing illustrates one of many means of exploiting the flow acceleration produced by the terrain effect. In this preferred embodiment the terrain effect is produced and exploited by the proximity interaction of the Windjuicer device with COTS sunroom 149. The terrain effect may be exploited by use of any artificial or natural bump element of sufficient size, proximity and juxtaposition to create the terrain effect while directing the enhanced fluidic flow into focusing chamber 111.

One of many possible embodiments of backstop diverter 151 is shown in the form of a topiary of any suitable species. In this preferred embodiment backstop diverter 151 comprises eight boxwood plants that are trimmed and arrayed in a smooth arc so as to intercept and divert any obliquely impinging breeze into the anterior orifice of focusing chamber 111. The height of backstop diverter 151 will be about the same as the height of the highest point of focusing chamber 111. The length of said arc is inherently dependent upon the peculiar conditions of each individual installation. The curve of the arc should not impinge on the projected plane of the front orifice of focusing chamber 111 by more than about ¼ of its projected area.

When a determination is made that a site demonstrates a tendency for a large percentage of ambient fluidic flow to approach apparatus 100 from an oblique angle, the use of backstop diverter 151 can be employed to divert these seasonal flows into focusing chamber 111. The arc begins in the proximity of the edge of the left or right side of focusing chamber 111. The backstop diverter 151 continues along in an arc shape until it comes to a juncture point, which is determined by a sidewalk or property edge in this example.

Figure 5:
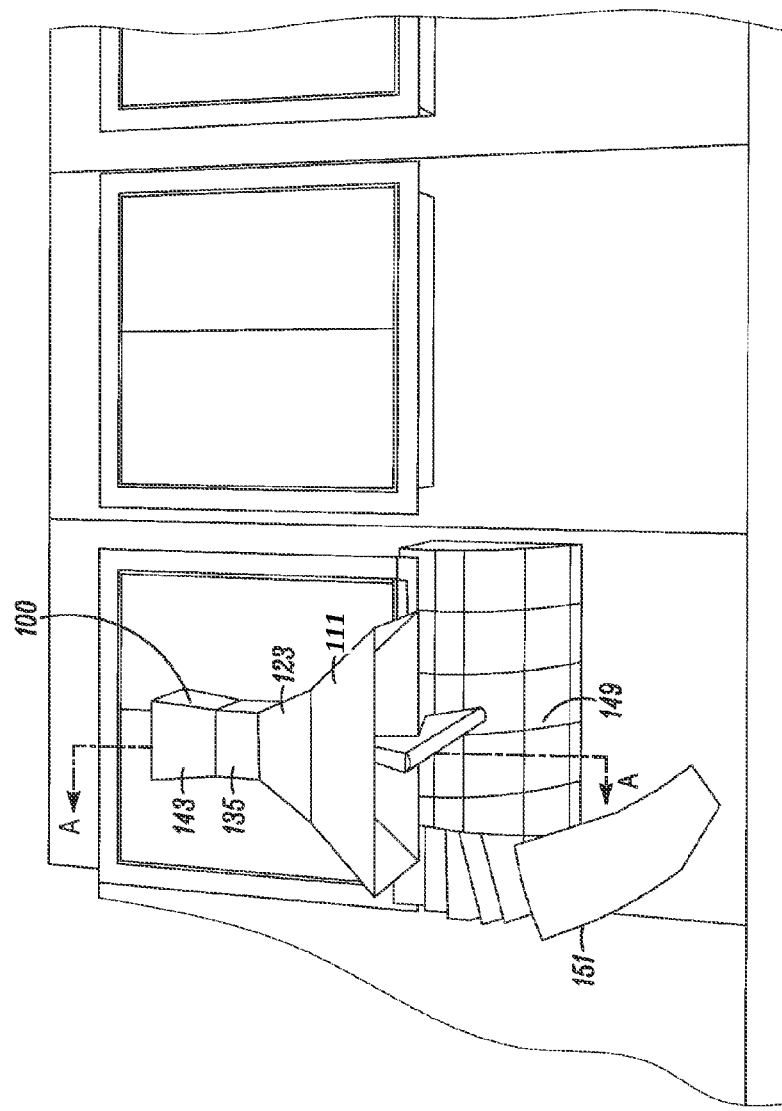
FIG. 5 is an aerial, plan-like perspective rendition of FIG. 4, according to an example embodiment. This shows the relative layout of one version of the proposed topiary and sunroom within a typical urban block arrangement. Once again the roof has been removed.

FIG. 5 is an aerial, plan-like perspective rendition of FIG. 4, according to an example embodiment. FIG. 5 shows the relative layout of one version of the proposed topiary and sunroom within a typical urban block arrangement. In this view, the roof has been removed for the sake of clarity. FIG. 5 is a semi-perspective plan view of all the elements shown in FIG. 4. This shows the relative location and curvature of the backstop diverter 151. This also shows the relative location of COTS sunroom 149.

Figure 6:
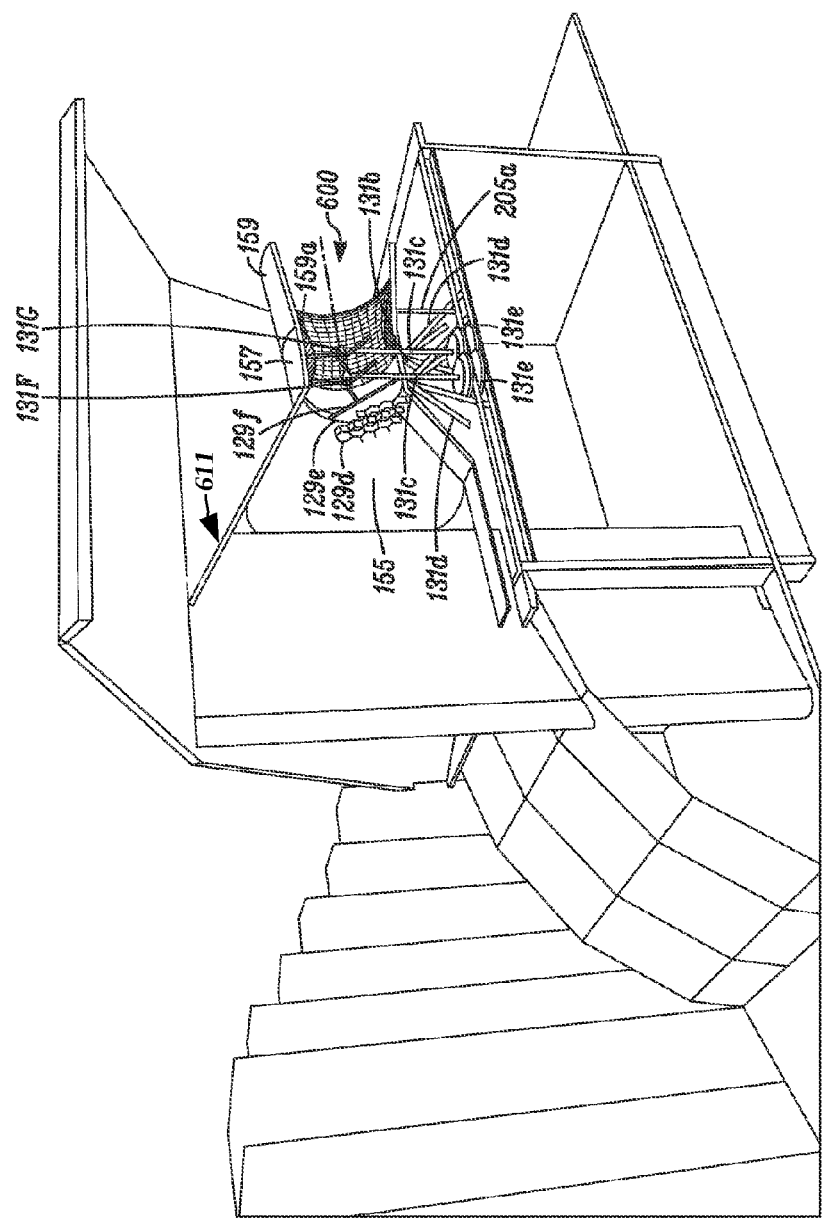
FIG. 6 is a perspective section along cutline A-A of FIG. 5, showing one example embodiment with alternatively shaped chambers. The chambers are curvilinear in form in this example embodiment. Additional features have been added. The apparatus is enclosed by a hypothetical COTS roof of a typical urban house cut along section A-A.

FIG. 6 is a cut away perspective section view of a fluidic flow capture and acceleration apparatus 600 along cutline A-A of FIG. 5, showing one example embodiment with alternatively shaped chambers. The chambers are curvilinear in form in this example embodiment. Additional features have been added. The apparatus 600 is enclosed by a roof of a residence or typical urban house. FIG. 6 includes substantially the same concatenation of serially axial flowing chambers as shown in FIG. 2 along with the appurtenances disclosed in FIGS. 4 and 5. However, an alternative embodiment to one or more of the disclosed chambers is hereby depicted. In this disclosure, focusing chamber 611 is in the shape of uniform oval contained within a gambrel roof, which typifies the urban house installation or platform of the embodiment presented here. This illustration further speaks to the degree of sound insulation redundancy that a typical installation will entail due to insulation within a typical roof. The dimensions of the anterior orifice of this elliptical embodiment are about 640 centimeters for the minor axis, and about 1300 centimeters for the major axis. A cross-section of focusing chamber 611 is an ellipse. The length of the elliptical cone of focusing chamber 611 is about 300 centimeters along the 'x' axis. The terminal orifice is in the approximate shape of a circle centered about the 'x' axis with diameter of about 560 centimeters.

The subsequent chamber is compressing chamber 155, which is firmly sealed at all edges fore and aft to the two connected chambers. It is configured in a cone shape of about 560 centimeters in diameter for the comparatively bigger orifice and 280 centimeters in diameter for the comparatively smaller orifice. In this preferred embodiment, it is about 300 centimeters in length along the 'x' axis. Just in front of one or more converters, such as HAT, is positioned a circular embodiment of the streamliner 129 (shown and described above in FIG. 1) comprising at least one rounded embodiment of honeycomb assembly 129d and at least one rounded embodiment of screen assembly 129e. In this embodiment, there is at least one rounded version of access panel 129f, which functions and is assembled in substantially the same manner as the rectilinear embodiments 129a, 129b and 129c (shown in FIG. 3). Substantially sealed and attached to the posterior edge of compressing chamber 155 is extraction chamber 157. In this cylindrical embodiment of the similar segment described earlier, similar dimensions are retained. Specifically, extraction chamber 157 about 280 centimeters in diameter and about 200 centimeters in length.

Attached and substantially sealed to the posterior edge of the extraction chamber 135 comes the diffusing chamber 159. It retains a similar coordination of dimensions to that of its homological rectangular version; about 280 centimeter diameter for the comparatively smaller orifice; about 340 centimeter diameter for the posterior orifice and about 300 centimeters in length measured along the 'x' axis. As with the rectilinear embodiment of the assemblage, the relative proportional dimensions are more importantly maintained than the individual dimensions. Thus, fluidic flow capture acceleration apparatus 600 can be resized for various applications. The size discussed above may be for a residential application. For larger residence or commercial building, the dimensions can be scaled up. In addition, the structure described can be further scaled up for different applications. The utility of this scalar flexibility will become more apparent as the wide variety applications which have already been discussed are disclosed in more detail in subsequent sections.

These curvilinear embodiments of the chambers can be constructed in the same manner using the same materials as the materials used to construct the rectilinear chambers detailed above.

In another embodiment, a second HAT 131g is installed relatively close behind and in direct axial conjunction to the initial HAT 131f. This ancillary example embodiment has the purpose of converting the substantial left over fluidic flow energy from the primary HAT as represented in the Betz extraction limit theorem which indicates that 48.7% of the fluidic flow energy will remain in the wake of an ideal wind turbine. All support and restraining elements are substantially identical in the case of a double HAT installation.

Figure 7:
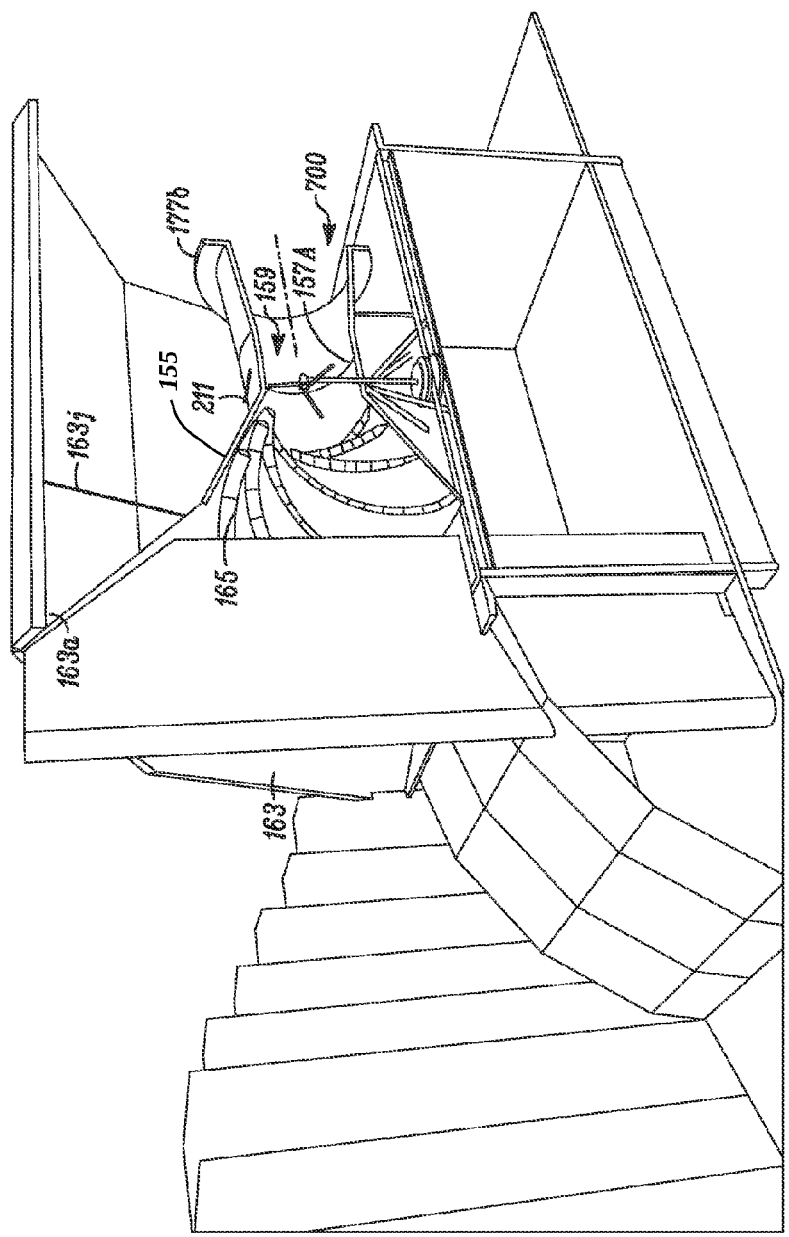
FIG. 7 is a similar sectional along cutline A-A of FIG. 5, showing another example embodiment. This drawing shows alternative configurations and materials along with additional features added.

FIG. 7 is a sectional along cutline A-A of FIG. 5, showing yet another example embodiment of the fluidic flow capture acceleration apparatus 700. This drawing shows alternative configurations and materials and has additional features added. FIG. 7 shows a section along A-A of substantially the same concatenation of serially axial flowing chambers as FIG. 6, but with the addition of some key appurtenances and homological changes. In this example embodiment, the streamlining assembly has been removed for graphic clarity. In this embodiment the focusing chamber 163 is in an irregular curvilinear shape formed by a supported membrane material. The anterior edge of the focusing chamber 163 are warped in such a way so as to join with the edge of the surrounding roof and retained by a skeletal framework 163a of any sufficiently strong solid or tubular shaped material. The primary dimensional relationships are about the same as that of the embodiment described for FIG. 6.

Attached to the focusing chamber 163 is substantially the same compressing chamber 155 as in previous FIG. 6. Affixed to the interior of compressing chamber 155 is depicted an evenly-spaced array of about 8 helical paddles 165 running the length of the chamber. Paddles 165 protrude about 30 centimeters in height in at least one of either a flat or triangular shape perpendicular to the attached surface. Paddles 165 are meant to induce a circular impetus onto the fluidic flow as it passes through the chamber. The circular flow is thereby intended to enhance the efficient transfer of circular torque to the propeller of the HAT.

All or any combination of the chambers may be formed by one or more of the following materials: polymers, fabrics, fibrous composites, crystalline, ceramic, metallic materials, or the like. These surface sheets may be self-supporting, mechanically connected directly to the sides of a platform or through a skeletal frame support which is further supported by sufficiently strong and resilient connections to a platform superstructure or any combination thereof.

Attached after the compressing chamber 155 is a different embodiment of the extraction chamber 157a. In this example embodiment the extraction chamber is suffused with a plurality of perforations of about 5 to 10 centimeters in diameter evenly spaced in sufficient number and proximity to the extraction chamber's anterior orifice to be optimally effective.

In this instance of the example embodiment, openings or holes pierce compressing chamber 155. The openings are substantially evenly spaced around the perimeter of compressing chamber 155. Approximately 6 to 12 of these holes with a diameter of approximately 20-40 cm in diameter are connected to flexible conducting tubes 211 (only one cut away tube is shown for graphic clarity). Flexible conducting tubes 211 are connected to metallic penetration tubes with jet nozzles (not shown) affixed and positioned so as to direct an even thin fluidic flow along the inner surface of extraction chamber 157a.

The purpose and intent of these flexible conducting tube elements 211 is to create a passive air film from the pressure in the focusing chamber transmitted through the tubes, sprayed over the surface of the receiving chamber (conversion chamber in this example embodiment) and thereby create a lubricating flow which will coat the walls of any one of the subsequent chambers. Such an air coating has been shown to have a beneficial effect on air passage through containing surfaces by lessening the friction of the walls. A passive airflow is induced by the pressure drop $(\rho/2*(V_2^2-V_1^2)$ and providing the passive airflow necessary to effectively reduce this frictional interaction. An array of lubricating flow jets can be placed in one or all of the chambers positioned after the focusing chamber.

The next appurtenance in succession is that of the protruding flange 177b. This element is in all respects similar to element 177a except that it is rounded so as to attach smoothly to a rounded embodiment of the diffusing chamber 159.

The two preceding curvilinear embodiments depicted in FIG. 6 and in FIG. 7 can contain any combination of the structures, materials and appurtenances described.

Figure 8:
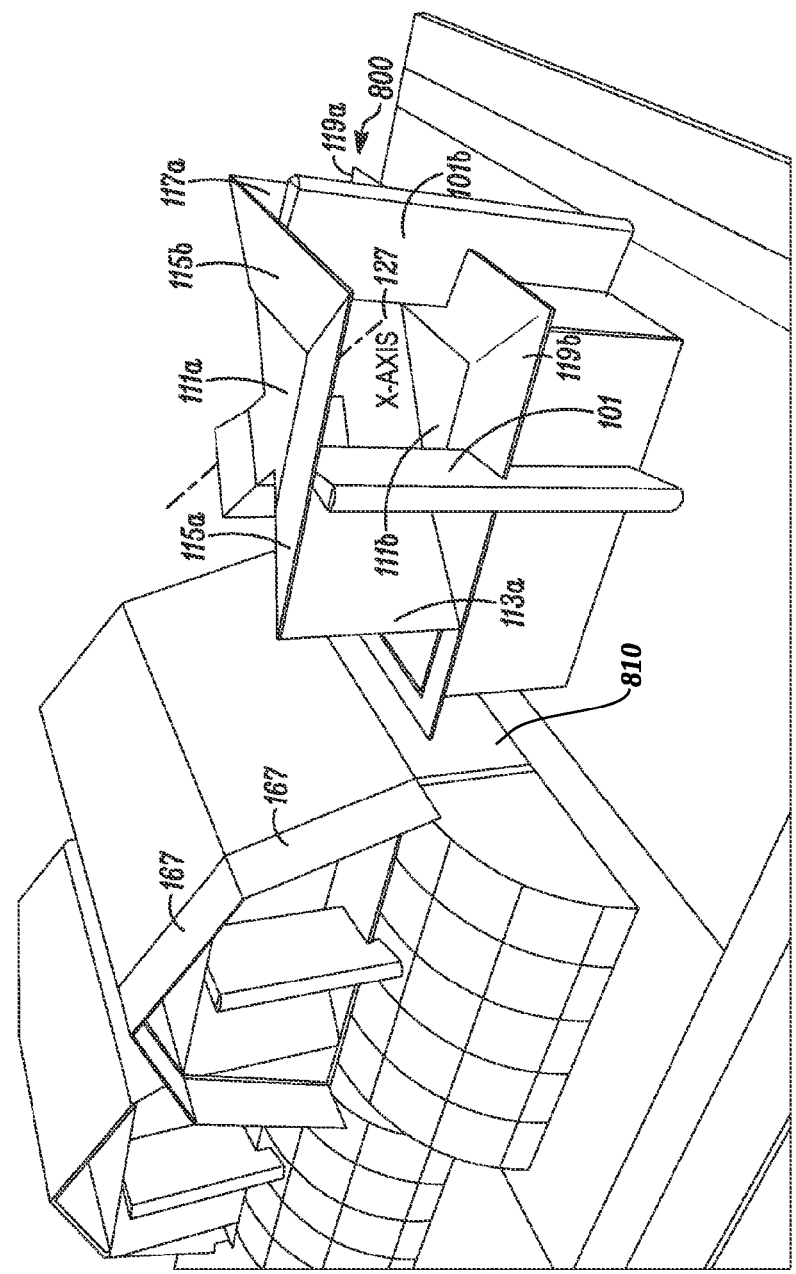
FIG. 8 discloses another example embodiment of the device in a perspective drawing in the context of a corner house which is open to both streets and two primary wind directions. In corner house 800, the focusing chamber reflects this by opening up at 180°. In corner house 800, an array of roof flap diverters is shown. The roof of corner house 800 has once again been removed.

FIG. 8 discloses another example embodiment of the device in a perspective drawing in the context of a corner house which is open to both streets and two primary wind directions. In corner house 800, the focusing chamber reflects this by opening up at 180°. In house 810, an array of roof flap diverters is shown. The roof of corner house 800 has once again been removed. The urban emplacement of the invention is yet another alternate example embodiment. In this example embodiment, the invention is installed in a house which is located on an urban street corner. With this placement and by melding two focus chambers orthogonally this installation has the potential to capture natural flows approaching within a 270° arc. The roof covering has been cut away for graphic clarity. This configuration is made by rearranging the elements of the apparatus shown in FIG. 1. Panel 113 (shown in FIG. 1) is substantially identical to the new emplacement of panel 113a. Panel 115a is substantially the same as panel 115 (shown in FIG. 1). Panel 115b is joined to the top edge of panel 115a but is turned counter clockwise 90°. Panel 117a is substantially the same as panel 117 (shown in FIG. 1) and is joined to the top edge of panel 115b. Panel 119a is joined to the bottom edge of panel 115b and is joined on the same plane to panel 119b. Panel 119b is joined to panel 113a at its bottom edge thus forming an extended anterior orifice for the focus chamber depicted in FIG. 8. A triangular transition panel 111b joins panels 119a and 119b with the bottom of panel 127 of the compressing chamber. At the top triangular transitional panel 111a similarly joins 115a, 115b and 123 which is the top panel of the compressing chamber. The remainder of the assemblage remains substantially the same as those example embodiments described in FIGS. 1 through 7. A fin diverter 101 is installed substantially in the same manner and relative location as the fin diverter in FIG. 1. A second fin diverter 101b is installed in a similar fashion along the 'x' axis of the orifice extension to the focus chamber from interior surface of panel 115b down to at least the inner surface of 119a.

On house or structure 810, protruding hinged flaps are shown 167. These are meant to extend beyond the edge of any enclosing roof. They may be swiveled up or down along the roof attachment either mechanically or by a sensor controlled motor. By strategically swiveling these elements a greater amount of fluidic flow may be captured.

Figure 9:
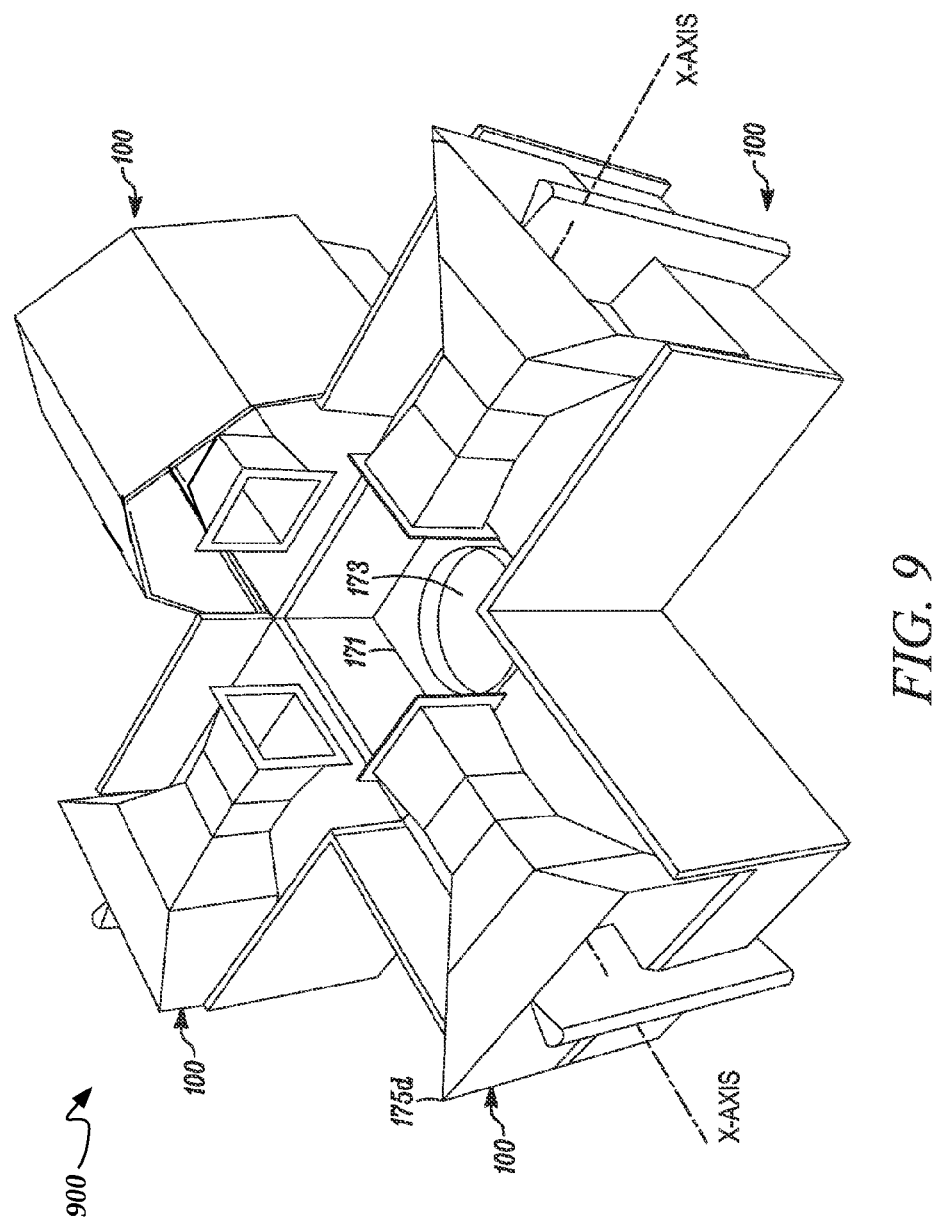
FIG. 9 shows a perspective of an example embodiment of the invention installed in an atrium configured structural platform in the guise of a quartet lobed house. Each house section holds a full configuration of the apparatus orthogonally arrayed around an atrium. In the center of the atrium is a pool of water. The roofs have been removed with the exception of one semi-transparent rendition.

FIG. 9 shows a perspective of an example embodiment of the apparatus 100 installed in an atrium-configured structural platform of quartet-lobed house 900. Each house section holds a full configuration of apparatus 100 substantially orthogonally arrayed around atrium 171. In the center of atrium 171 is pool of water 173. The roofs have been removed with the exception of one semi-transparent rendition. FIG. 9 shows a perspective of four individual installations of apparatus 100 arrayed together back-to-back on elevated platforms. In one example embodiment, these are rooms of a house that surround atrium 171. Atrium 171 contains pool of water 173 filling at least 75% of the surface of atrium 171, which is open to the sky. Pool of water 173 is thereby exposed to warm sunlight, resulting in an evaporative induced micro low-pressure zone. Through the agency of the actions of a cyclonic cell dynamic, an air flow will be induced sucking in air from the surroundings and lifting upwards over the pool of water 173. In this way an air flow will be induced through the length of each of the four copies of apparatus 100.

The array of focusing chambers covering all four cardinal directions any breeze will be snatched into one or more of the chamber assemblies and refined into enhanced electrical production.

Figure 10:
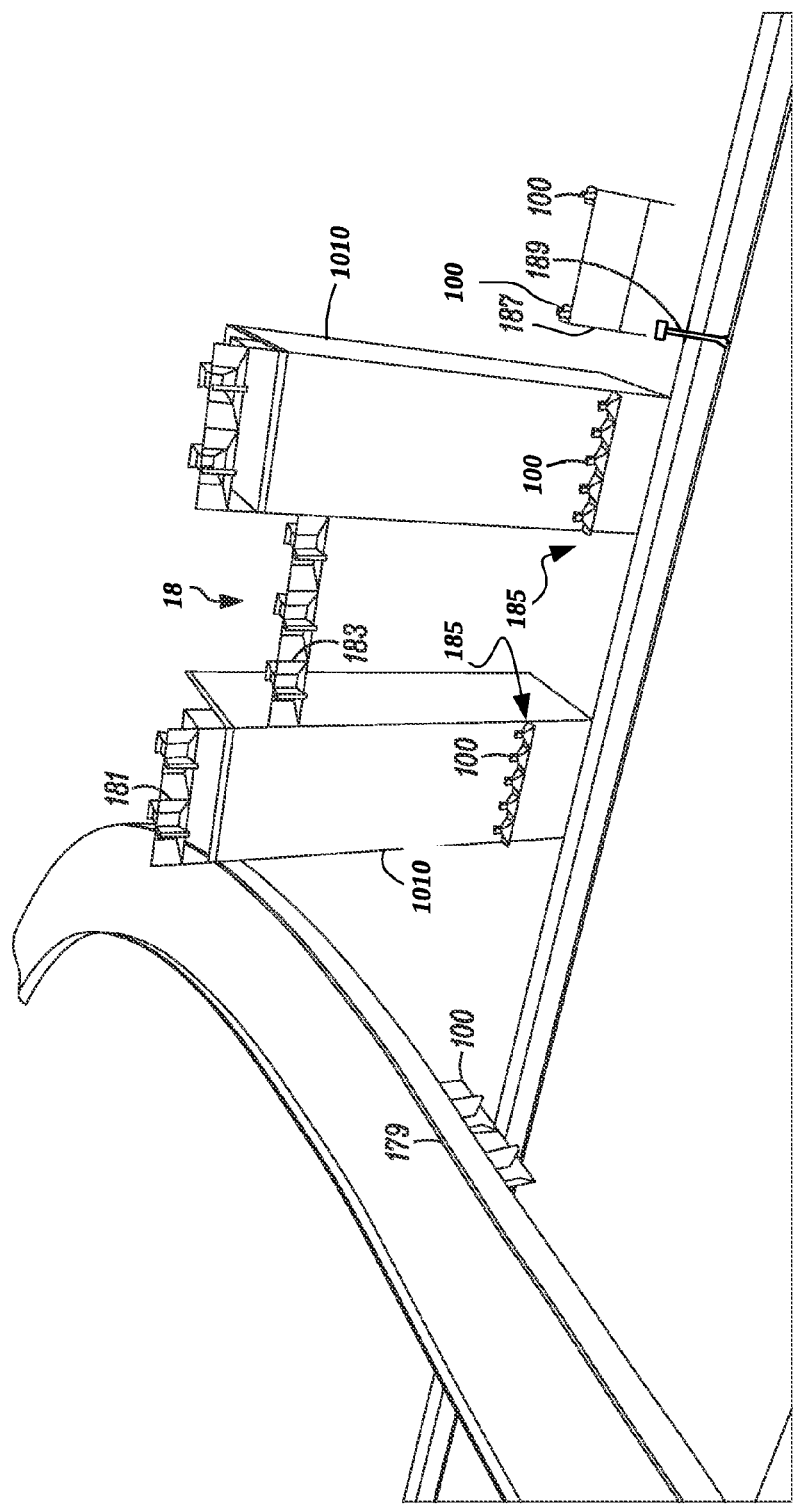
FIG. 10 shows a perspective drawing of another example embodiment of the invention which describes a plurality of potential deployments and scales of the invention. One example embodiment of the invention is attached to a highway overpass. Another example embodiment shows one or more version of the invention attached to one or more towers 1010.

FIG. 10 shows a perspective drawing of other example embodiments of apparatus 100. FIG. 10 shows a plurality of potential deployments and scales of apparatus 100. One example embodiment of the invention is attached to highway overpass 179. Another example embodiment shows one or more versions of apparatus 100 attached to one or more towers 1010. FIG. 10 also shows one or more example embodiments of apparatus 100 attached to billboard 187. Apparatus 100 could also be attached to streetlight 189. FIG. 10 shows the invention's scale flexibility and utilization of the benefits of the invention in the context of tall commercial building towers An array of appropriately scaled-up example embodiments of apparatus 100 can be installed atop one or more roof edges 181 of towers 1010. Further utilization can be made through the agency of bridge 183 between two adjacent towers 1010 and suitably sized versions of apparatus 100 to take advantage of accelerated breezes squeezed between buildings 1010. In another smaller scaled embodiment, one or more coupled rows 185 of apparatus 100 would form a series of down facing chambers in order to capture the up flowing wind. By this means, the natural acceleration of wind is diverted up the facade of buildings 1010 can be exploited for energy conversion.

Figure 11:
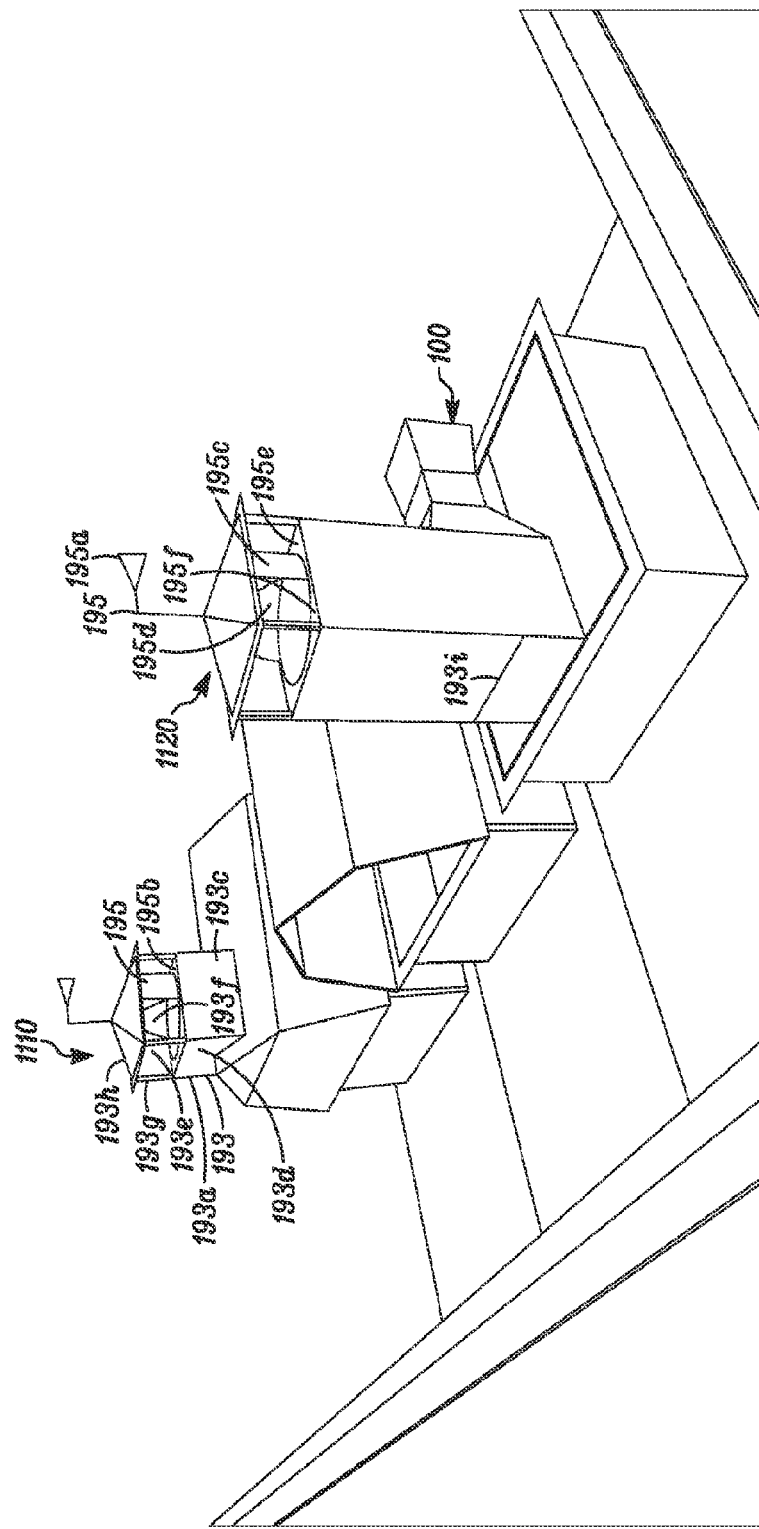
FIG. 11 shows a perspective view of a periscoping capture assembly, according to an example embodiment. Tower 1110 shows what an actual installation would look like. Tower 1120 shows a cut-away describing how the tower connects to one version of the Windjuicer apparatus without the focusing chamber. For the sake of clarity, the roof has again been cut away.

FIG. 11 shows a perspective view of a periscope-like wind capture tower appendage, according to an example embodiment. Tower 1110 shows what an actual installation would look like. Tower 1120 shows a cut-away describing how the tower connects to one version of the Windjuicer without the focusing chamber. For the sake of clarity, the roof has again been cut away. FIG. 11 shows the application of an alternate appurtenance to allow the main apparatus to function in difficult locations. There are two views of this appurtenance termed the periscope-tower for wind capture above obstructions. House or structure 1120 shows the tower installed in an example embodiment where it pokes through a standard house roof. A house or structure 1110 shows the same tower with the roof removed so as to reveal the attachment of the Windjuicer apparatus to the base of the tower. The tower in this example embodiment includes elements of wood frame construction, such as 2×4 wood framing with dry wall interior and a sufficiently weather proof exterior surfacing. Alternatively it may be constructed of one or more of the following; masonry, concrete, flexible or rigid membrane, polymers, artificial or natural fibers and any combinations thereof.

The tower 193 includes four supporting and enclosing planes or panels 193a, 193b, 193c, and 193d and an open cornice 193e. Four posts creating the open cornice 193g. A vertical lined shaft 193f which directs wind down to the main apparatus at the bottom (an approved fire protective lining will be mandated by civil building code for this configuration). The tower also includes a protective roof assembly 193h. A removable access panel 193i is located at any facet of the base and at any suitable size to allow access for maintenance.

Located at the top of the tower as shown in structures 1110, 1120 is installed a rotating scoop assemblage that is characterized by of one or more of the following elements:
- an effectively shaped wind vane which in this preferred embodiment is triangular 195a;
- the vane is connected by a swing boom to a rotatable pole or mast 195b
- the mast penetrates and is held by the roof 193h through a rotating flange assembly 195h 195i and 195j (shown and described in FIG. 15A);
- the mast connects and transmits the movements of the wind vane to a truncated half cylinder scoop 195c;
- a quarter hemispherical interior surface 195d which redirects an impinging fluidic flow from a horizontal direction to a vertical direction and into the tower shaft;
- a sufficiently strong chase top 195e which retains the track of rotation 195f while holding up the rotating scoop 195 and is sufficiently connected to the panels of the tower to support all the scoop elements;
- a circular track 195f to facilitate the scoop rotation;

This rotating scoop assembly includes at least some of the interconnected parts as depicted on FIG. 11 which are formed out of one or more of the following; metallic sheeting, polymer sheeting, artificial or natural fibers or wood frame construction and any combinations thereof.

The tower may be of any suitable size. In this preferred embodiment there is at least one tower of about 560 centimeters square at the base, and about 2050 centimeters from ground to roof cornice. the clearstory below the cornice is about 250 centimeters tall on all four sides the rotating ½ cylinder scoop is about 248 centimeters tall, and about 500 centimeters in diameter the circular hole is about 520 centimeters in diameter.

Figure 12:
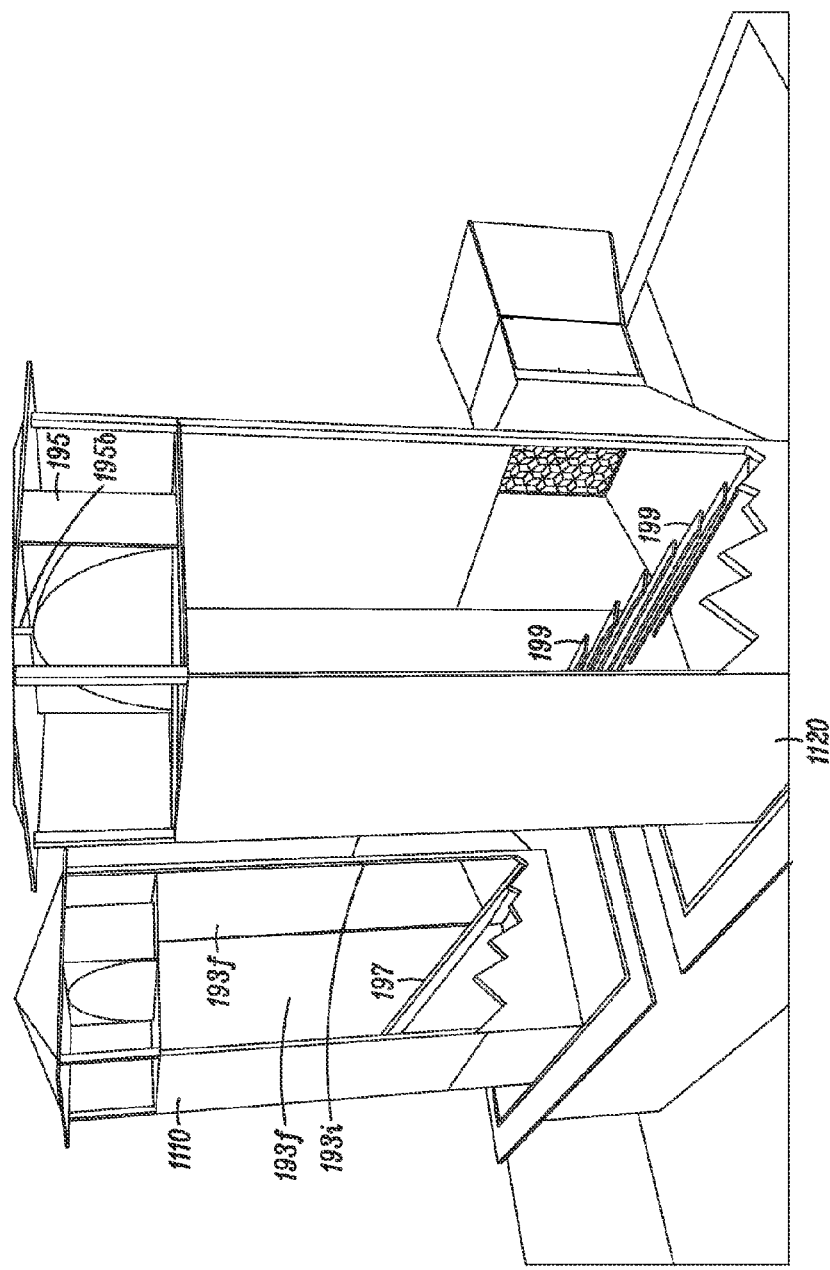
FIG. 12 shows a cutaway close-up perspective of the same elements as FIG. 11. A tower 1110, uses one example embodiment of an angled panel deflecting means to redirect a vertical fluidic flow back into a horizontal trajectory into one version of a compressing chamber. Tower 1120 shows vertical flow being redirected into one version of a compressing chamber by way of one version of a cascade of strategically curved and tilted vanes.

FIG. 12 shows a cutaway close-up perspective of the same elements as FIG. 11. Tower 1110 uses one example embodiment of an angled panel deflecting means to redirect a vertical fluidic flow back into a horizontal trajectory into one version of a compressing chamber. Tower 1120 shows vertical flow being redirected into one version of a compressing chamber by way of one version of cascade of curved and tilted vanes 199. FIG. 12 shows the same two tower configurations in a cutaway rendition revealing two means of fluidic flow redirection from vertical within the tower to horizontal into the compressing chamber. It should be noted however that applicant intends to encompass any structure presently existing or developed in the future that performs the same function. Structure 1110 shows the tower with protective lining 193f of any ASTM approved configuration and opening 193i into the compressing chamber. The opening is to be of a size sufficient to conduct all available fluidic flow into the compressing chamber without restriction. In the preferred embodiment it is about 520 centimeters by about 520 centimeters. The flow redirecting panel 197 is fixed at all edges to the walls of the tower with the lowest edge aligned to the lowest edge of the anterior compressing chamber orifice. The panel is angled at about 45° from the horizontal plane of the platform.

In structure 1120, the tower lining and opening are the same as in structure 1110. In this example embodiment, the instrument of redirection consists of cascade of curved and tilted vanes 199. The relative size, shape, number, and arrangement is determined by optimal flow redirection results. Vanes 199 may be arrayed in a horizontal plane or at any effective angle. In the preferred embodiment shown in structure 1120, there are seven curved and tilted vanes 199, each one about 104 centimeters in width and about 520 centimeters in length angled about 45° to horizon and about parallel to the flat panel in the configuration of structure 1110.

Figure 13:
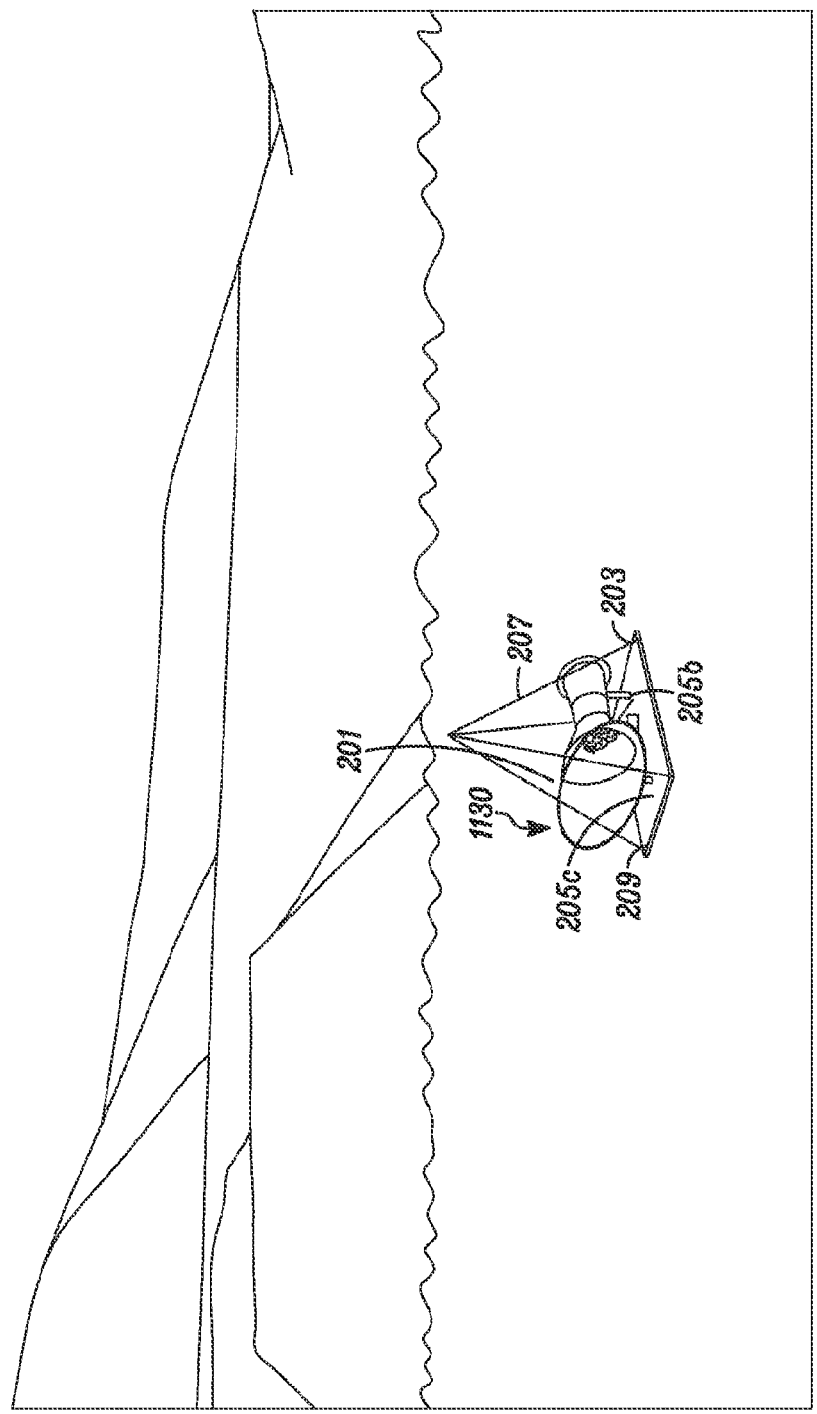
FIG. 13 shows an underwater deployment of another example embodiment of the invention which has been waterproofed. This unit is attached to a sinking platform of sufficient mass to keep the unit at the desired depth. Also shown are COTS lowering cables and remote controlled detachment bars.

FIG. 13 shows an underwater deployment of another example embodiment of the invention which has been waterproofed. This unit is attached to a sinking platform of sufficient mass to keep the unit at the desired depth. The platform is lowered with lowering cables and remote controlled detachment bars. FIG. 13 shows a submersible embodiment of the Windjuicer apparatus 201. In this example embodiment many of the elements are sealed away from water exposure. All exposed elements are treated to prevent or substantially slow corrosion from salt water. Extra vertical supports are strategically located and affixed to the underside of each chamber or chamber joint 205b in the rear and 205c in the front. A water submerging platform 209 is used to hold and stabilize the Windjuicer assemblage through the vertical supports. Four remotely actuated cable connectors 203 are affixed at the four corners of the submerging platform. An array of COTS cables 207 of sufficient strength and flexibility are used to raise and lower the submersible Windjuicer assemblage.

FIGS. 14A-14C show two dimensional details of attachment of the apparatus, according to several example embodiments. FIG. 14A shows attachments of one version of the invention in which one or more chamber panels are fashioned from a membrane. This is a close-up of the focusing chamber as shown on FIG. 7. FIG. 14B shows an attachment detail for the posterior edge of the membrane panel of the focusing chamber and how that membrane will transition into a membrane embodiment of the compressing chamber. FIG. 14C shows an example embodiment of the tower appendage from FIGS. 11 and 12 showing a cutaway detail of the track connection to the revolving wind catcher. Now referring to FIGS. 14A, 14B, and 14 C, the specifics for attaching and mounting various embodiments will now be discussed.

FIG. 14A shows one example attachment configuration between a membrane embodiment of any of the preceding chambers to the installation platform. In this example embodiment, the platform is a house roof and the membrane is an impervious Teflon coated fiberglass sheet of about 1.5 millimeters in thickness. FIG. 14A shows the anterior edge of the focusing chamber 163b supported and firmly held by a rigid tube skeletal assembly 163a. The membrane with a hemmed cable 163c is held taught by one or more cables 163d of a sufficiently flexible nature to maintain a firm membrane surface without tearing. The cable is retained by an eyelet 163e of a sufficiently rigid material which is connected to the structure of the platform by a connecting means 163f.

FIG. 14B shows an intermediate chamber support comprising an overlay patch 163i with an eyelet pass-through centrally attached containing a grommet reinforcement. All are of the same material as the membrane except the grommet which is of a sufficiently rigid material to hold the cable and prevent tears. The support is provided by a cable tie-back 163g secured to the platform structure by a mini-shock absorber 163h. Rigid support for the transition joint between the focusing chamber 163b and the compressing chamber 163k is provided by one of either a tubular 163j or rod assembly of sufficiently rigid material.

FIG. 14C shows the detail of the connection between the half truncated rotating cylinder 195c and the track 195f. The lower edge of the half truncated rotating cylinder 195c is supported by a gliding means 195m which in turn is supported by the chase top 195e. The interior wall of the rotating cylinder is further supported by an attached metal 1' angle 195k which rests upon the edge of the chase top through a second gliding means 195m. Sandwiched between the inner support angle 195k and the bottom of the cylinder 195c is affixed another longer 'L' metal angle 195n. In this preferred embodiment the portion of angle 195n which fits inside of a Teflon coated track 195f is also Teflon coated for facilitating easy slidability.

FIGS. 15A-15C show two-dimensional details of one version of the appendage tower shown in FIGS. 11 and 12. FIG. 15A shows a cutaway detail of the weather vane connected rod passing through the tower roof. FIG. 15B shows the means for connecting a vane trunnion to the tower wall. FIG. 15C shows one version of the retainer connection between at least one of a VAT, HAT, NRC or WHAT. FIG. 15A shows a means of passing the vane rotation rod 195b through the supporting roof structure 193h while maintaining rotatability. FIG. 15B shows how the curved vane 199 and trunnion 199a are attached to the opposing walls of the tower 193a and 193c. FIG. 15C shows one of many means for steadying a HAT.

FIG. 15A shows rotatable flange 195i securely holding the rod 195b in place while allowing rotation. The rod 195b is further held in place by an upper 195h and lower 195j attached washers.

FIG. 15B shows one of a group of cascading curved vanes 199 with an attached trunnion 199a. Upon the trunnion are mounted an array of triangular wire prongs 199b of sufficient resilience to allow flexing into a trunnion cover tube 199d and sufficient spring-back to pop up above the coordinated slots cut through the tube. In this example embodiment at least two evenly spaced rows of four substantially evenly spaced wire triangular prongs 199b are arrayed. The inner tube 199d contains a coordinated series of slots 199c to allow each one of the prongs to pop up into the slot and thereby retain the trunnion firmly in position. An outer sleeve 199e is secured to both ends of the inner tube of sufficient size and rigidity to allow a secure bond between it and the tower walls. The space between the inner tube 199d and the outer cover 199e must be sufficient to allow the prongs 199b to effectively pop up through the slits 199c which in this example embodiment is about 2 centimeters.

FIG. 15C shows a collar 131h which retains a HAW 131f at the point it connects with stand 131c. A set of sufficiently strong pins 131i further retains the HAW in a straight position facing the oncoming fluidic flow.

Figure 16B:
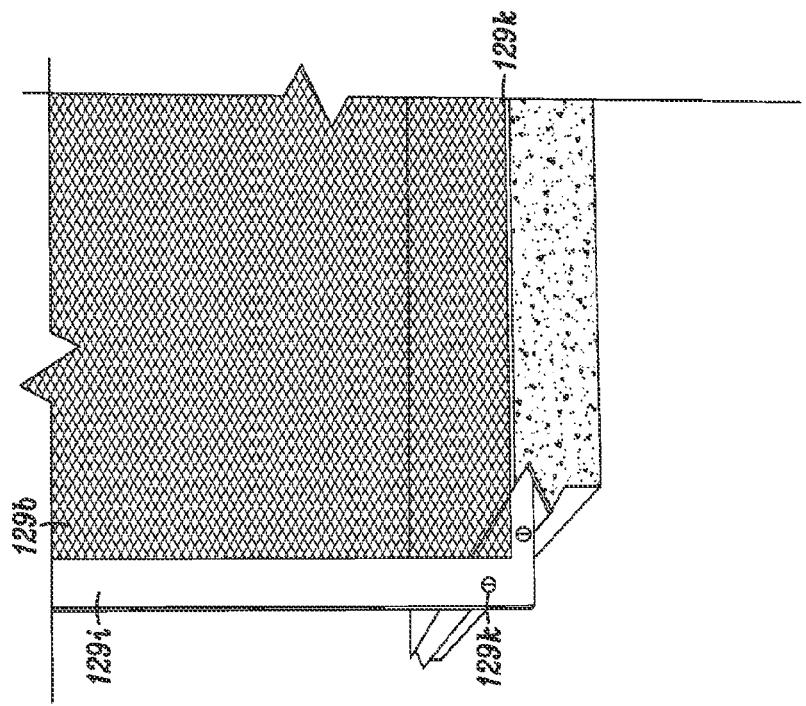
FIG. 16B shows a cut-out segment of the chamber panel groove holding the screen frame, according to an example embodiment.
Figure 16A:
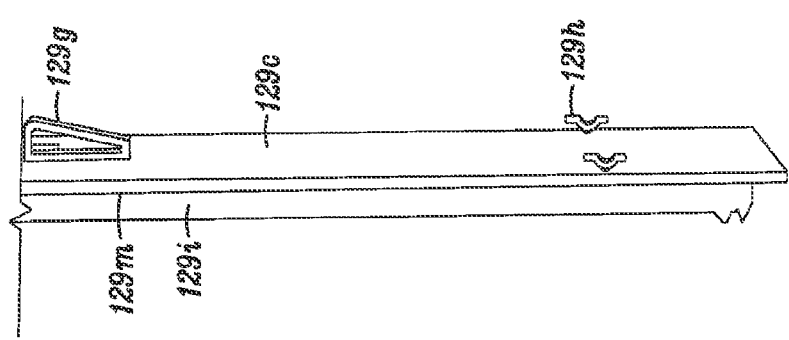
FIG. 16A shows a portion of the access panel, according to an example embodiment.

FIG. 16 shows three dimensional details of various elements of the streamlining assembly which are not explicitly shown in other drawings. FIG. 16A shows a portion of the access panel, according to an example embodiment. FIG. 16B shows a cut-out segment of the chamber panel groove holding the screen frame, according to an example embodiment.

FIG. 16A shows a cut-away drawing of the access panel attachment 129c. The handle 129g is attached centrally on the panel and is sufficient for repeated removal of the entire assembly by hand. 129h shows one of 4 clamping means in the form of wing nuts which screw into any one of the two chamber walls which are suitable for this assembly's placement (compressing or extraction chamber). Affixed around the inner edge of the panel attachment is a flexible gasket 129m whereby an effective seal may be maintained. 129i is a cutaway drawing of the frame.

FIG. 16B shows the framed screen portion of the streamlining assembly positioned within the groove 129k incised into the panels of the containing chamber. 129i is a cut-away of the screen frame. 129k shows 2 of about 16 screws used to maintain a secure clamp around the edges of the screen 129b.

A device, termed the 'Windjuicer', enhances the process of converting fluidic flow into electrical energy comprising an assemblage of functionally discreet yet interactive elements which includes one or more of the following:

a fluidic flow directing means termed a 'Fin Diverter' or diverter;

a fluidic flow focusing means termed a 'Focusing Chamber';

a fluidic flow constricting means termed a 'Compression Chamber';

a fluidic flow laminating and filtrating means termed the 'Streamlining' assembly or streamliner;

a fluidic flow turbine enclosure means termed a 'Extraction Chamber';

a fluidic flow to energy conversion by way of a turbine or comparable termed converter;

a fluidic flow sucking means termed a 'Diffusing Chamber';

a fluidic flow to energy converting means comprising either a non-rotational conversion device or one of many available turbine devices which will be referred to as either a VAT (vertical axis turbine), HAT (horizontal axis turbine) or a WVAT (water vertical axis turbine) or simply as the converter;

a fluid flow sucking means termed a 'Diffusing Chamber';

a fluidic flow dispersal means termed a 'Diffusing Flange';

a Terrain Effect actuating means termed a "Bump";

an oblique flow intercepting device termed "Backstop Diverter" or backstop;

a circumference array of flow capture and carrying tubes along with a back-end spray nozzle termed 'Lubrication Layer Injectors' or injectors;

a fluidic flow overhead capture means termed 'Periscope Tower' or periscope;

a fluidic flow rotating capture means placed either at the upper stage of the periscope tower or at the main axis of chamber assemblies is termed the 'Rotating Scoop' or scoop; and the entire apparatus comprising any combination of the elements here disclosed is termed the 'Windjuicer.'

Some or all the above elements, along with various appurtenances, function interactively. Fluidic flows are captured, then accelerated while maintaining laminarity and the energy of the fluidic flow is converted into electricity. In one embodiment, this is accomplished through the sequential interaction of each element, which are coaxially aligned around a hypothetical central axis and are serially conjoined to work in conjunction to first capture by redirection of a fluidic flow by means of the diverter and focusing said flow by means of the focusing chamber, and then accelerating the flow by said compressing chamber, then filtering out any extraneous materials while instilling a laminarity to the flow by said streamliner then by visually and audibly isolating the energy conversion process by surrounding the moving parts of a fluid flow conversion device with an insulated and isolated extraction chamber. Finally adding additional acceleration impetus to the fluidic flow through the suction action of the terminal diffusing chamber.

In one embodiment, the fin diverter precedes the concatenation of chambers and is partially set into the anterior orifice of said focusing chamber. The fin diverter is horizontally centered on an 'x' axis and extends vertically from the underside of the top plane of the focusing chamber to some distance between the bottom plane of the focusing chamber and the ground. The fin diverter is a column-like element that has a top and bottom with one or more covering elements or covers. The covers are either be solid or porous. The edges of which are joined to all the vertical walls of the fin diverter whereby all vertical surfaces are sealed by said covers. the front, rear and two flanking vertical planes of the fin diverter consist of curvilinear surfaces. The anterior and posterior edges of the fin diverter include at least one bullnose shaped surface. The edges of the arc of each bullnose form one or more seamless joints with the left and right flanking vertical surfaces and with the bottom and top covering surfaces. In one embodiment, the anterior bullnose has a larger radius than the posterior bullnose. Both the left and right flanking surfaces are concave in shape running up and down forming a continuous surface which is sealed at all edges containing one or more vents. The shape and location of the fin diverter enables capture of a more diverse range of impinging angles of fluidic flow.

In another embodiment the focusing chamber includes a plurality of frustum shaped enclosing planes distributed around the 'x' axis are fastened together seamlessly creating two openings at the planes touching the 'x' axis referred to as the anterior orifice for the larger facing away from the assemblage and the smaller referred to as the posterior orifice facing toward the assemblage, the frustum walls proceed along the 'x' axis diminishing in size and tending towards convergence around the 'x' axis from anterior to posterior. The focusing chamber is in a serial axial flow relationship to all the subsequent chambers in the concatenation.

In yet another example embodiment, at least one compression chamber is fastened to posterior edges of the preceding focusing chamber. In one embodiment, the compression chamber includes four or more frustum shaped enclosing planes distributed substantially equally around the 'x' axis which are fastened together substantially seamlessly. The frustum walls proceed along the 'x' axis diminishing in size and tending towards convergence around the 'x' axis from anterior to posterior with two open sides touching the 'x' axis.

In still another example embodiment, at least one extraction chamber is fastened to the posterior edges of the compression chamber. In one embodiment, this chamber includes four planer, rectangular surfaces of which one or more can be of substantially equal dimensions which are arrayed at substantially right angles to each other and at a substantially equal distance to the central 'x'-axis with joined edges forming one of either a rectangular chamber or a multisided pyramidal frustum chamber. The two end facets touch and are substantially centered upon the 'x' axis of which form an anterior orifice and posterior orifice. The anterior orifice edges fit smoothly with the posterior edges of the compression chamber orifice. The interior extraction chamber volume is to be sufficient to completely enclose said converter without hindering any moving parts while providing a supporting means for insulation and affording access to the converter contained therein.

Still another embodiment, the diffusing chamber includes four planer surfaces forming a pyramidal frustum equidistantly arrayed about the 'x' axis and open at the planes touching the 'x' axis, which is fastened to all the posterior edges of said extraction chamber at all its anterior edges forming the final chamber in the concatenation, the anterior opening forming the smaller and the larger the posterior opening.

Still another embodiment includes any of the above apparatus wherein embodiment firmly affixed and braced within the interior space defined by the extraction chamber, is at least one converter. The converter comprises an NRC, VAT, HAT, or WHAT or any conversion device presently existing or developed in the future. In one embodiment, the largest moving element of said energy converter is to be centered at the 'x' axis and the front facing side if any is to be oriented towards the open anterior aperture of the extraction chamber. No structural or bracing element is to in any way encumber the necessary, free movement of the elements of the conversion process. However, while any movement directly related to conversion is to remain free, no other movement or redirection is to remain uncontrolled by at least one of braces, stays, pins, or collars or any combination thereof.

Still another embodiment includes any of the above apparatus and includes streamlining assembly which includes of one or more layers of wire mesh screens tightly held apart and secure by a sufficiently strong and rigid frame. The frame, in one embodiment, includes at least two rigid containing elements which are themselves held together by a set of removable affixing means. The entire assembly is substantially rigid, smooth, and planner so as to facilitate removal through a slot in the extraction chamber. The size relationship between the slot and the frame is such that the frame will fit firmly yet allow removal while being flush to the inner walls of the chamber of the frame. The frame is dimensioned to firmly fit within a groove placed into three of the four sides of said extraction chamber. The frame is attaches to a cover located on the outside surface of the extraction chamber. The frame can include one or more exterior handles to facilitate easy removal for cleaning and screen replacement. The cover is to fit firmly against the outer walls of the chamber with a flexible gasket means that can form a substantially air tight seal to the chamber. With the use of a variable pressure retainers. which can facilitate both the removal of the frame and the sealing of the gasket can hold the entire assembly firmly in place to the outer chamber wall. At least one honeycomb like element, termed the honeycomb, is to placed perpendicular to the 'x' axis between the screens and the extraction chamber anterior orifice. The honeycomb can be affixed to all four interior walls of the extraction chamber with sufficient strength whereby said honeycomb will resist the flow forces that will interact with it.

In any of the above embodiments, the apparatus can include a focusing chamber in the shape of a truncated cone or elliptic cone formed and sized proportionately to the rectilinear embodiment discussed above, and similarly joined to at least one curved orifice of the compression chamber.

In any of the above embodiments, the compression chamber is in the shape of a truncated cone or elliptic cone formed and sized proportionately to the rectilinear embodiment discussed above and similarly joined to at least one curved orifice of the focusing chamber as well as at least one curved orifice of the extraction chamber.

In any of the above embodiments, the extraction chamber is in the shape of a truncated tube or elliptic tube or cone formed and sized proportionately to the rectilinear embodiment and similarly joined to at least one curved orifice of the compression chamber as well as at least one curved orifice of the diffusing chamber.

In any of the above embodiments, the diffusing chamber is in the shape of a truncated cone or elliptic cone formed and sized proportionately to the rectilinear embodiment discussed above and similarly joined to at least one curved orifice of the focusing chamber as well as at least one curved orifice of the extraction chamber.

In any of the above embodiments, the energy converter contained within the extraction chamber is followed by a similar second converter similarly centered on the 'x' axis and similarly installed to that of the apparatus as discussed above so as to provide an unencumbered space for any appropriately moving parts to work freely while retaining the direction of the axis from shifting. In this way, the conversion of the left over wind energy from the primary converter as represented in the Betz extraction limit theorem which indicates that 48.7% of the energy will remain in the wake of a turbine converter.

In any of the above embodiments, the streamlining assembly is fashioned so as to fit into a curvilinear embodiment as described above. One or more elements of said streamlining assembly can be contained within one or more of either the compressing chamber or extracting chamber.

In any of the above embodiments, the compression chamber is lined with a plurality of evenly spaced helical paddles running the length of the chamber. The purpose of these paddles is to induce a cyclonic motion to the incoming fluidic flow in order to enhance the torque motion of a HAT propeller.

In any of the above embodiments, the interior walls that are formed into a concave curved airfoil shape with the lifting surface facing the 'x' axis. The intent for which is to introduce a greater dispersion when applied to the diffusing chamber of exiting fluidic flow thereby inducing greater suction.

In any of the above embodiments, either the compression chamber or the diffusing chamber is configured with a plurality of substantially evenly spaced slightly protruding jets angled about parallel to the surrounding inner chamber wall. The purpose of which is to eliminate any potential surface separation between the passing laminar fluidic flow and the chamber's surface. The holes are of sufficient size, quantity. and spacing so as to create an effective lubricating fluidic layer. The fluidic flow pressure is captured by a coordinated plurality of receiving holes in the focusing chamber and transporter by means of attached tubes of comparable size to said jets.

In any of the above embodiments, the diffusing chamber's posterior orifice is encircled by at least one flange of approximately affixed to the posterior aperture of the chamber extending outward away from the 'x' axis. The purpose of this being to decrease the relatively low pressure around the posterior section of the diffusing chamber whereby the sucking force will be intensified.

In any of the above embodiments, a rectilinear or curvilinear bump is placed in front of and below the element of the focusing chamber's anterior aperture closest to the ground. The element acts as a wedge extends from the ground up to the lower panel of the focusing chamber whereby the approaching fluidic flow will be accelerated just prior to its entry into the focusing chamber through the 'terrain effect'.

In any of the above embodiments, a wall or an arrayed topiary arc whereby a natural fluidic flow approaching the apparatus at an oblique angle to the 'x' axis is redirected into the anterior aperture of the focusing chamber.

In any of the above embodiments, the panels forming one or more of said chambers are formed by pliable materials or membranes which are held in place by an assemblage of rigid framing elements secured to an installation platform or by a system of a taught cable assemblies or any combination thereof.

In any of the above embodiments, the focusing chamber's anterior orifice is extended orthogonally to form two contiguous openings at right angles to each whereby a greater opening and latitude enable a greater intake of fluidic flow. In one embodiment, each opening contains one or more strategically located fin diverters.

In any of the above embodiments, one or more rotatable flaps are attached to the front edge of a roof wherein the apparatus discussed above is installed. The purpose of said flaps is to redirect additional fluidic flow into the anterior orifice of said focusing chamber.

In any of the above embodiments, four individual installations of the invention are arrayed together back to back on elevated platforms surrounding at least one open atrium containing at least one open water pool. A configuration of this nature can process a fluidic flow from any direction as well as taking advantage of induced low pressure from evaporation of the open water pool.

In any of the above embodiments, a concatenation of small scale versions of said apparatus are attached to the side of a tower-building forming a pedestrian portico over the walkway. One or more rows of the apparatus can be arrayed facing downward and thereby can engage in the capture of air flow diverted up any side of the building facade.

In any of the above embodiments, an array of appropriately scaled-up embodiments can be installed atop to the side or in between one or more tower-buildings whereby fluidic flow redirected around the building edges can be exploited for energy conversion.

In any of the above embodiments, an array of appropriately scaled embodiments of said apparatus are attached to and facing out beyond the edge of bridges and or overpasses. The accelerated and focused fluid flow induced by these structures can be exploited for energy conversion.

In any of the above embodiments, one or more appropriately scaled embodiments of said apparatus are attached upon the horizontal or vertical supports of one or more of the following;
street light assemblies,
sign assemblies, or
billboard assemblies.

In any of the above embodiments, a waterproofed embodiment of said apparatus which is placed underwater in such a position as to enable the exploitation of natural fluidic flows of bodies of water. One or more WHAT's are used for the conversion of water fluidic flow into electricity. The apparatus is affixed to a platform to which all supports are engaged. One or more cables are to be attached by means of remotely retractable cable connectors. The platform further includes of at least one of a solid sufficiently heavy material or a fillable chamber which can be filled alternately with a gas or liquid whereby the entire assemblage is maintained at a desired level and position within the water. This alternate configuration of the apparatus can be deployed in bodies of water whereby the naturally occurring fluidic flows can be exploited for renewable energy.

In any of the above embodiments, an appurtenance thereto in the form of at least one periscope-like scoop tower termed the periscope tower or periscope is used. The periscope tower is placed in front of the anterior aperture of the compressing chamber. This element includes at least one of a rectilinear or curvilinear tower assembly of sufficient size and rigidity to capture fluidic flow which is being obstructed from entering the anterior aperture of the apparatus by reaching above or around the obstruction. then by conducting that flow down to the level of the anterior aperture of the compressing chamber and then by redirecting it into said aperture. The main elements of said periscope are:

a rotatable weather vane;

a connecting rod whereby the vane rotations may be transmitted to a rotatable cylindrical fluidic flow capture scoop;

the tower assembly which supports all other parts of the periscope while forming an enclosure to conduct the fluidic flow vertically down;

a fluidic flow redirection device comprising at least one of cascade of rotatable deflecting vanes or angled panel deflector or any combination thereof, whereby the vertical flow is redirected horizontally into the compressing chamber anterior orifice.

The panel deflector is sufficiently rigid and secured at all four sides to the walls of the tower at a height and angle sufficient to deflect the maximum fluidic flow into the center of the compressing chamber anterior orifice. In the alternative, a cascade of curved fluidic turning vanes are arrayed in sufficient size and number to redirect all downward flowing fluids substantially 90° back in a direction toward the entrance of the focusing chamber orifice. Each turning vane, in one embodiment, is secured to a rigid trunnion affixed at each end. The trunnion has a sufficient length to protrude beyond each edge of its bonded vane to fit firmly into an adjustable wall sleeve which has been secured into the wall of the tower.

Although the present invention has been described in considerable detail with reference to certain preferred versions thereof, other versions are possible. Therefore, the spirit and scope of the appended claims should not be limited to the description of the example embodiments contained therein. It should be noted that applicant intends to encompass any structure presently existing or developed in the future that performs the same function. While the invention has been described with reference to a number of example embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope and spirit thereof. It should be further pointed out that complete flexibility is possible as to the interchange of different combinations of appurtenances, attachments, and shapes as may be best suited to the particulars of any one distinct situation therefore it is intended that the invention not be limited to the particular embodiment disclosed as the best mode contemplated for carrying out this invention, but that the invention will include all embodiments falling within the scope of the appended claims. Any element in a claim that does not explicitly state "means for" performing a specified function, or "step for" performing a specified function, is not to be interpreted as a "means" or "step" clause as specified in 35 U.S.C. §112, ¶6. In particular, the use of "step of" in the claims is not intended to invoke the provisions of 35 U.S.C. §112, ¶6.

What is claimed is:

1. An apparatus for converting fluidic flow into electrical energy, the apparatus comprising:
    a focusing chamber having an entrance through which fluidic flow enters the apparatus;
    a fin diverter having a convex anterior edge, a posterior edge, a curvilinear concave left flanking surface, and a curvilinear concave right flanking surface, the convex anterior edge being wider than the posterior edge and being positioned forward of the entrance of the focusing chamber for directing fluidic flow into the focusing chamber;
    a constricting chamber having an inlet adjacent a downstream end of the focusing chamber to receive the fluidic flow from the focusing chamber, the constricting chamber having a flow passage that converges in a frustum shape from the inlet end of the constricting chamber to an outlet end of the constricting chamber;
    a streamliner positioned proximate the constricting chamber for providing laminar quality to the fluidic flow exiting the constricting chamber;
    an extraction chamber positioned adjacent the streamliner for receiving the fluidic flow;
    an energy converter driven by the fluidic flow passing through the extraction chamber for producing electrical energy; and
    a diffusing chamber positioned to receive at an inlet end the fluidic flow passing out of the extraction chamber, the diffusing chamber having a flow passage that diverges from the inlet end of the diffusing chamber to an exhaust end at which the fluidic flow exits the apparatus.

2. The apparatus of claim 1, wherein the focusing chamber, the constricting chamber, the extraction chamber, and the diffusing chamber form a seamlessly concatenated assembly.

3. The apparatus of claim 2, wherein the seamlessly concatenated assembly is configured to receive a flow of air between buildings.

4. The apparatus of claim 1, wherein the focusing chamber comprises at least four frustum-shaped planes converging to join the inlet end of the constricting chamber.

5. The apparatus of claim 1, wherein the focusing chamber comprises a set of two contiguous openings at right angles to each other, the set of two contiguous openings each containing a separate fin diverter.

6. The apparatus of claim 1, wherein the fin diverter extends vertically across a centerline of the focusing chamber, and wherein the convex anterior edge comprises a first arc, and the posterior edge is convex and comprises a second arc, and wherein the first arc has a radius larger than that of the second arc.

7. The apparatus of claim 1, wherein the extraction chamber comprises four planar, rectangular surfaces enclosing the energy converter.

8. The apparatus of claim 1, wherein the extraction chamber comprises a removable panel for accessing the energy converter.

9. The apparatus of claim 1, wherein the diffusing chamber comprises at least four frustum-shaped places diverging from an outlet of the extracting chamber.

10. The apparatus of claim 1, wherein the energy converter comprises a device selected from the group consisting of non-rotational conversion device, vertical axis turbine, horizontal axis turbine, water vertical axis turbine, and combinations thereof.

11. The apparatus of claim 1, wherein the energy converter is centered within the extraction chamber and oriented towards an inlet of the extracting chamber.

12. The apparatus of claim 1, wherein the energy converter is connected to the extracting chamber by a plurality of support posts.

13. The apparatus of claim 1 and further comprising a second energy converter positioned within the extraction chamber in tandem with the energy converter for converting remaining wind kinetic energy into electrical energy.

14. The apparatus of claim 1, wherein the streamliner comprises a plurality of streamlining membranes, the streamlining membranes being secured by a plurality of rigid frames for removably affixing the streamlining membranes within the extracting chamber.

15. The apparatus of claim 14, wherein the plurality of rigid frames comprise at least one handle accessible from an exterior surface of the extracting chamber.

16. The apparatus of claim 15 and further comprising a plurality of gaskets for sealing the plurality of streamlining membranes to an interior surface of the extracting chamber.

17. The apparatus of claim 14, wherein at least one of the plurality of membranes comprises a wire mesh screen.

18. The apparatus of claim 14, wherein at least one of the plurality of membranes comprises a honeycomb structure for providing the laminar quality to the fluidic flow.

19. The apparatus of claim 1, wherein a plurality of panels of the chambers comprise cavities for placement of sound insulating material having a sound transmission class rating between 30 and 60.

* * * * *